United States Patent
Ricci et al.

(10) Patent No.: US 9,512,252 B2
(45) Date of Patent: Dec. 6, 2016

(54) BIS-IMINE COMPLEX OF LANTHANIDES, CATALYTIC SYSTEM COMPRISING SAID BIS-IMINE COMPLEX AND PROCESS FOR THE (CO)POLYMERIZATION OF CONJUGATED DIENES

(75) Inventors: Giovanni Ricci, Parma (IT); Anna Sommazzi, Novara (IT); Giuseppe Leone, Milan (IT); Aldo Boglia, Milan (IT); Francesco Masi, Sant'Angelo Lodigiano-Lodi (IT)

(73) Assignee: Versalis S.P.A. (IT)

(*) Notice: Subject to any disclaimer, the term of this patent is extended or adjusted under 35 U.S.C. 154(b) by 194 days.

(21) Appl. No.: 14/344,351

(22) PCT Filed: Sep. 13, 2012

(86) PCT No.: PCT/EP2012/067989
§ 371 (c)(1),
(2), (4) Date: Apr. 8, 2014

(87) PCT Pub. No.: WO2013/037910
PCT Pub. Date: Mar. 21, 2013

(65) Prior Publication Data
US 2014/0228206 A1    Aug. 14, 2014

(30) Foreign Application Priority Data
Sep. 14, 2011  (IT) ............... MI2011A1650

(51) Int. Cl.
B01J 21/00    (2006.01)
B01J 23/00    (2006.01)
(Continued)

(52) U.S. Cl.
CPC ............ *C08F 136/06* (2013.01); *C08F 36/00* (2013.01); *C08F 136/00* (2013.01); *C08F 136/08* (2013.01)

(58) Field of Classification Search
USPC ................... 502/102, 100, 150, 200, 300
See application file for complete search history.

(56) References Cited

U.S. PATENT DOCUMENTS 6,780,947 B1 * 8/2004 Sommazzi ........... C07D 213/53
                                                      502/103
6,780,974 B2 * 8/2004 Chen ................ C07K 14/43595
                                                      530/350
(Continued)

FOREIGN PATENT DOCUMENTS

WO    2004074333 A2    9/2004

*Primary Examiner* — James McDonough
(74) *Attorney, Agent, or Firm* — Tarolli, Sundheim, Covell & Tummino LLP

(57) ABSTRACT

A bis-imine complex of lanthanides having general formula (I): Said bis-imine complex of lanthanides having general formula (I) can be advantageously used in a catalytic system for the (co)polymerization of conjugated dienes.

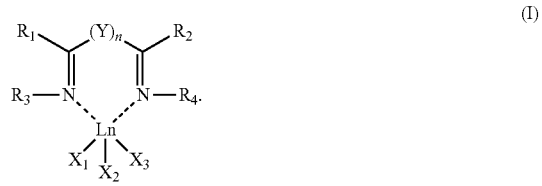

9 Claims, 9 Drawing Sheets

¹H-NMR spectra of polybutadiene (on the left; Table 3, Example 97) and polyisoprene (on the right; Table 2, Example 79) obtained by means of the classical ternary system AlEt₂Cl/Nd (OCOC₇H₁₅)₃/Al (ⁱBu)₃

(51) Int. Cl.
*B01J 25/00* (2006.01)
*B01J 29/00* (2006.01)
*B01J 31/00* (2006.01)
*B01J 37/00* (2006.01)
*C08F 136/06* (2006.01)
*C08F 36/00* (2006.01)
*C08F 136/00* (2006.01)
*C08F 136/08* (2006.01)

(56) References Cited

U.S. PATENT DOCUMENTS

| | | | | |
|---|---|---|---|---|
| 2006/0142145 A1* | 6/2006 | Thiele | ............... | B01J 31/143 502/103 |
| 2008/0114136 A1* | 5/2008 | Suzuki | ............... | C07F 5/00 526/161 |
| 2010/0286350 A1* | 11/2010 | Cui | ............... | C08F 36/04 526/172 |

* cited by examiner $^1$H-NMR spectra of polybutadiene (on the left; Table 3, Example 97) and polyisoprene (on the right; Table 2, Example 79) obtained by means of the classical ternary system AlEt$_2$Cl/Nd(OCOC$_7$H$_{15}$)$_3$/Al($^i$Bu)$_3$ FT-IR spectra of polybutadienes obtained with (a) $AlEt_2Cl/Nd(OCOC_7H_{15})_3Al(^iBu)_3$ (Table 3, Example 97); (b) $NdCl_3(L3)/TIBAO$ (Table 1, Example 46); (c) $NdCl_3(L4)/TIBAO$ (Table 1, Example 49); (d) $NdCl_3(L11)/DIBAH$ (Table 1, Example 56).

$^1$H-NMR spectra (on the left) and $^{13}$C-NMR (on the right) of polybutadiene ($C_2D_2Cl_4$ as deuterated solvent, HMDS as internal standard, 103°C) obtained with $NdCl_3(L12)$/TIBAO (Table 1, Example 57)

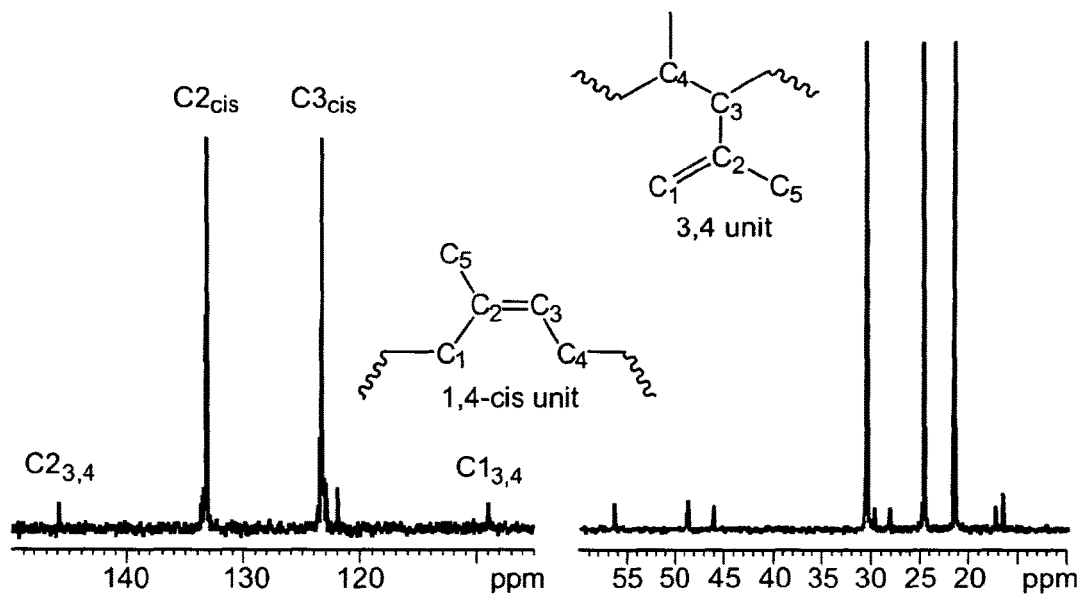
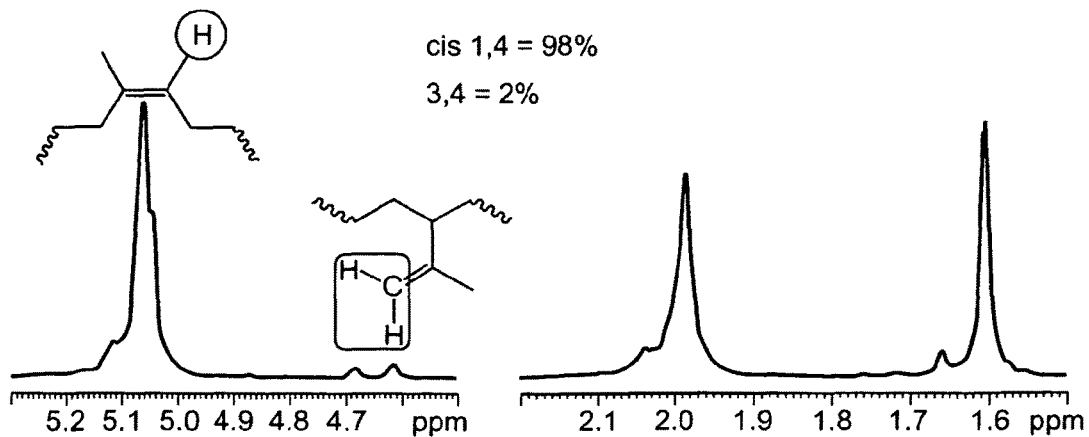
Fig. 4
$^1$H-NMR spectra (down) and $^{13}$C-NMR (up) ($C_2D_2Cl_4$ as deuterated solvent, HMDS as internal standard, 103°C) of polyisoprene obtained with $NdCl_3(L2)$/TIBAO (Table 2, Example 69)

FT-IR (nujol) spectrum of the complex NdCl$_3$(L1) (Example 20)

DSC diagram of polyisoprene obtained by means of $NdCl_3(L2)/TIBAO$
(Table 2, Example 69)

DSC diagram of polyisoprene obtained by means of NdCl$_3$(L4)/TIBAO (Table 2, Example 72)

DSC Diagram of polyisoprene obtained with $NdCl_3(L14)/TIBAO$
(Table 2, Example 71)

BIS-IMINE COMPLEX OF LANTHANIDES, CATALYTIC SYSTEM COMPRISING SAID BIS-IMINE COMPLEX AND PROCESS FOR THE (CO)POLYMERIZATION OF CONJUGATED DIENES

The present invention relates to a bis-imine complex of lanthanides.

More specifically, the present invention relates to a bis-imine complex of lanthanides and its use in a catalytic system for the (co)polymerization of conjugated dienes.

The present invention also relates to a catalytic system for the (co)polymerization of conjugated dienes comprising said bis-imine complex of lanthanides.

Furthermore, the present invention relates to a (co)polymerization process of conjugated dienes, in particular a process for the polymerization of 1,3-butadiene or isoprene, characterized in that it uses said catalytic system.

It is known that the stereospecific (co)polymerization of conjugated dienes is an extremely important process in the chemical industry for obtaining products which are among the most widely-used rubbers.

BRIEF DESCRPTION OF THE DRAWINGS

FIG. 1 illustrates $^1$H-NMR spectra of polybutadiene (on the left; Table 3, Example 97) and polyisoprene (on the right; Table 2, Example 79) obtained by means of the classical ternary system AlEt$_2$Cl/Nd (OCOC$_7$H$_{15}$)$_3$/Al(iBu)$_3$.

FIGS. 2A-D illustrate FT-IR spectra of polybutadienes obtained with (a) AlEt$_2$ Cl/Nd(OCOC$_7$H$_{15}$)$_3$Al($^i$Buh)$_3$ (Table 3, Example 97); (b) NdCl$_3$(L3)/TIBAO (Table 1, Example 46); (c) NdCl$_3$(L4)/TIBAO (Table 1, Example 49); (d) NdCl$_3$(L11)/DIBAH (Table 1, Example 56).

FIG. 4 illustrates $^1$H-NMR spectra (down) and $^{13}$C-NMR (up) (C$_2$D$_2$Cl$_4$ as deuterated solvent, HMDS as internal standard, 103° C.) of polyisoprene obtained with NdCl$_3$(L2)/TIBAO (Table 2, Example 69).

Figure 1:
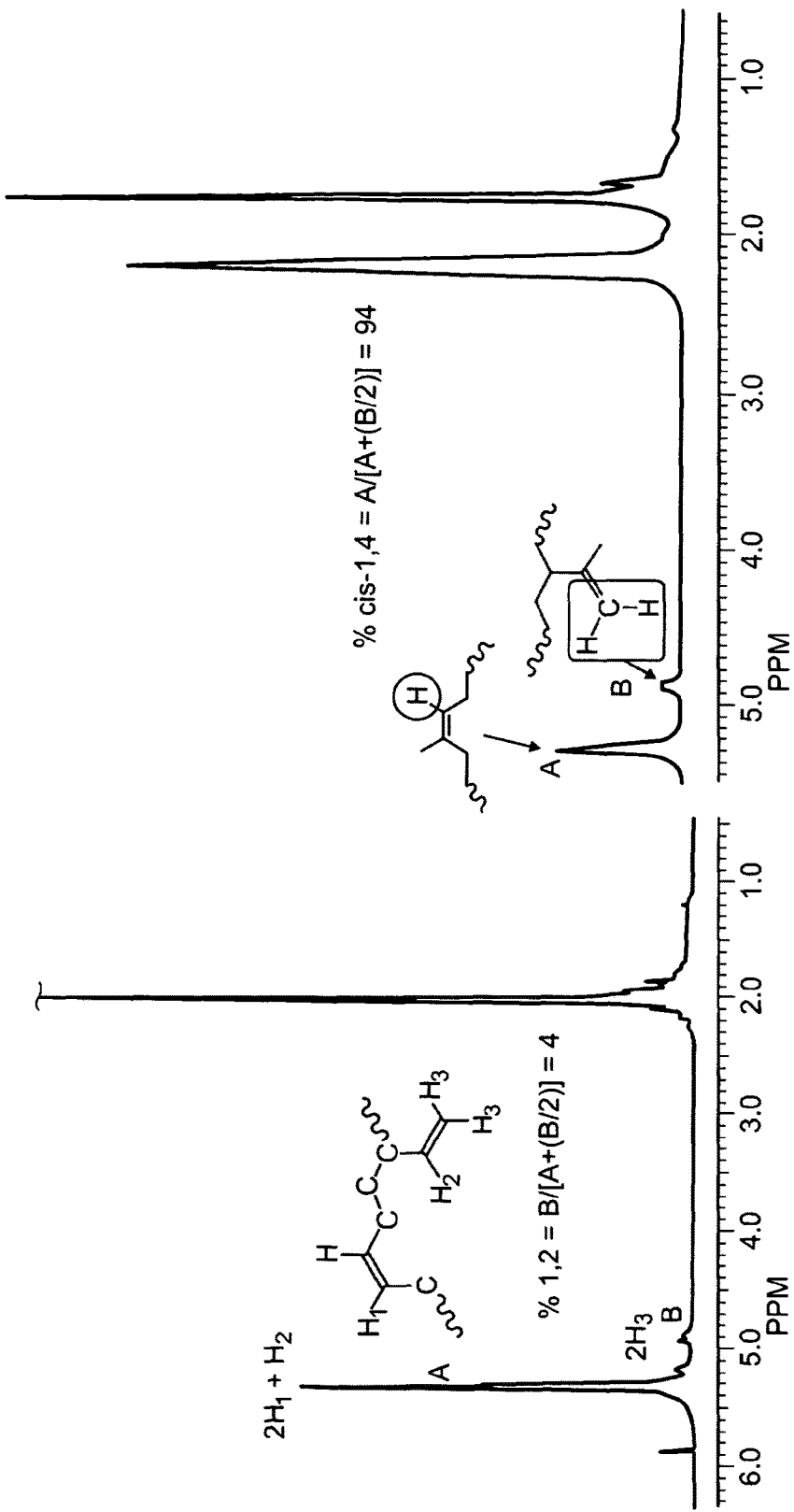

It is known, for example, that polybutadiene 1,4-cis is a synthetic elastomer whose properties are very similar to those of natural rubber. Since the beginning of stereospecific polymerization, numerous catalytic systems have been used for the production of this elastomer, as described, for example, by Porri L. et al. in: "Comprehensive Polymer Science" (1989), Eastmond G. C. et al. Eds., Pergamon Press, Oxford, UK, Vol. 4, Part II, pages 53-108.

A first catalytic system capable of giving a polybutadiene having a 1,4-trans content ranging from 70% to 90% is described in U.S. Pat. No. 3,050,513 and was based on titanium compounds containing iodine, such as titanium tetraiodide (TiI$_4$), combined with an aluminium hydride such as, for example, lithium-aluminium hydride, sodium-aluminium hydride, potassium-aluminium hydride, rubidium-aluminium hydride, cesium-aluminium hydride.

Efforts were then made in the art to find catalytic systems capable of giving polybutadiene having a high content of 1,4-cis units.

Catalytic systems capable of giving a polybutadiene having a 1,4-cis content equal to about 93% are described, for example, by W. Cooper in "The Stereo Rubbers" (1977), Ed. W. M. Saltman, Wiley, New York, page 21 (catalytic system: AliBu$_3$-TiI$_4$); W. Marconi et al., in "Chimica Industriale" (1963), Vol. 45, page 522 (catalytic system: AlEt$_3$-AlEt$_2$I—TiCl$_4$); W. Marconi et al., in "Journal of Polymer Science" (1965), Part A, Vol. 3, page 735 (catalytic system: AlHCl$_2$.OEt$_2$-TiCl$_4$—AlI$_3$).

The formation of catalytic systems characterized by a higher stereospecificity capable of giving polybutadiene having a content of 1,4-cis units equal to about 96%, is described, for example: with respect to catalytic systems comprising cobalt, in Italian patent IT 592,477 and by Gippin M. et al. in "Industrial & Engineering Chemistry, Product Research and Development" (1962), Vol. 1(1), pages 32-39; with respect to catalytic systems comprising nickel, by Ueda et. al., in "Koogyo Kagaku Zasshi" (1963), Vol. 66, page 1103, and by Throckmorton et al. in "Rubber Chemistry and Technology" (1972), Vol. 45, pages 268-277.

Some works relating to the use of catalytic systems comprising lanthanides for the 1,4-cis polymerization of conjugated dienes were published in the first half of the sixties'.

Saltman et al. in "Rubber Chemistry and Technology" (1973), Vol. 46, page 1055 and Throckmorton et al. in "Kautschuk and Gummi Kunstoffe" (1969), Vol. 22, page 293, for example, describe the use of catalytic systems comprising cerium. Said catalytic systems were soon abandoned as a result of the metal residues remaining in the polymer which caused an oxidation of the polymer itself.

The use of catalytic systems comprising lanthanides such as, for example, neodymium, praseodymium and gadolinium, is also known, as described, for example, by: Hsieh H. L. et al. in "Rubber Chemistry and Technology" (1985), Vol. 58(1), pages 117-145. The polybutadiene obtained using these catalytic systems has a content of 1,4-cis units of about 98%, a good processability, and a relatively large molecular weight distribution.

The use is also known of catalytic systems comprising uranium allyls capable of providing a polybutadiene having a very high content of 1,4-cis units (i.e. ≥99%) as described, for example, by Lugli et al. in "Die Makromoleculare Chemie" (1974), Vol. 175, Issue 7, pages 2021-2027; De Chirico A. et al. in "Die Makromoleculare Chemie" (1974), Vol. 175, Issue 7, pages 2029-2038; Bruzzone M. et al. in "Rubber Chemistry and Technology" (1974), Vol. 47, page 1175; Mazzei A. in "Die Makromoleculare Chemie" (1981), Vol. 4, Issue Supplement 3, pages 61-72. These catalytic systems, however, were also abandoned due to the presence of radioactive residues in the polymers obtained.

From the above documents it emerges, however, that the use of catalytic systems comprising lanthanides offered advantages with respect to the use of catalysts based on titanium, cobalt and nickel, previously proposed and in use at the time. In particular, catalytic systems comprising lanthanides, as mentioned above, were capable of giving polymers, in particular polybutadiene, having a higher content of 1,4-cis units (≥97%), with a more linear structure and, consequently, more suitable for the production of tyres, which represents the most important application (about 80%) of polybutadiene 1,4-cis use. Furthermore, the above catalytic systems comprising lanthanides did not have a cationic activity and proved to have a higher activity when used in solution polymerization in the presence of aliphatic solvents rather than aromatic solvents, as described, for example, by Ricci G. et al., in "Die Makromoleculare Chemie", Rapid Communications, (1986), Vol. 7, page 335.

Further studies were then carried out with the aim of finding new catalytic systems comprising lanthanides and/or of improving the catalytic activity of already known catalytic systems.

In particular, studies were mainly carried out on catalytic systems comprising neodymium as these catalytic systems had a higher catalytic activity with respect to catalytic systems comprising other lanthanides and they were capable of providing polymers which, after vulcanization, had a higher resistance to aging with respect to the polymers obtained with catalytic systems comprising titanium, cobalt and nickel. Furthermore, these studies were also supported by the great availability, at a low price, of the precursors, including neodymium.

European patent EP 0 076 535, for example, describes an enhanced process for the (co)polymerization of conjugated diolefins comprising the use of a particular catalytic system including at least one compound of a metal selected from those of Group III B of the Periodic System having an atomic number between 21 and 103, preferably neodymium, a derivative of an organic halide and an organometallic compound containing aluminium such as, for example, alkyl aluminium hydride or trialkyl aluminium hydride. Said procedure allows (co)polymers having a high content of 1,4-cis units (>98%) and a high linearity, to be obtained.

U.S. Pat. No. 4,242,232 describes a catalyst comprising (a) a reaction mixture formed by reacting a carboxylate of a metal having an atomic number ranging from 57 to 71 such as, for example, lanthanum, cerium, praseodymium, neodymium with an aluminium tri-alkyl, (b) an aluminium alkyl and/or an aluminium alkyl hydride and (c) a Lewis acid. The polybutadiene obtained by using said catalyst has a content of 1,4-cis ranging from 80% to 99%.

In their simplest form, the catalytic systems comprising neodymium are obtained by reaction between neodymium trichloride, as such or complexed with donors (e.g., alcohols, ethers, tri-butyl-phosphate, alkyl-sulfoxides, amides, pyridine), and an aluminium tri-alkyl (e.g., aluminium tri-iso-butyl, aluminium tri-ethyl, aluminium tri-methyl): in this case, these are binary catalytic systems. Said binary catalytic systems are described, for example, by Yang J. H. et al., in "Macromolecules" (1982), Vol. 15(2), pages 230-233; Porri L. et al. in "Macromolecular Symposia" (1998), Vol. 128, Issue 1, pages 53-61.

Alternatively, neodymium chloride can be obtained by reaction of a neodymium compound (e.g., alcoholate, carboxylate) with a chlorine donor (e.g., di-ethyl aluminium chloride, ethyl-aluminium dichloride, bis-aluminium tri-ethyl trichloride, t-butyl chloride), and then reacted with an aluminium alkyl or an aluminium tri-alkyl: in this case, these are tertiary catalytic systems. Said tertiary catalytic systems are described, for example, by: Cabassi F. et al. in "Transition Metal Catalyzed Polymerizations" (1988), Quirk R. P. Ed., Cambridge University Press, MA, USA, pages 655-670; Ricci G. et al. in "Polymer Communications Guilford" (1987), Vol. 28, Issue 8, pages 223-226; or in Italian patent IT 1,197,465.

The order for adding the components (chlorine donor, aluminium alkyl or aluminium tri-alkyl) to the neodymium compound, can be extremely important for the nature of the catalytic system to be obtained. By first adding aluminium alkyl hydride or aluminium tri-alkyl and only subsequently the chlorine donor, in fact, homogeneous catalysts are obtained; vice versa, when the chlorine donor is added before the aluminium alkyl hydrate or the aluminium tri-alkyl, heterogeneous systems are obtained, as described, for example, by Porri et al. in "ACS Symposium Series" (2000), Vol. 749, Chapter 2, pages 15-30. The order of adding the above-mentioned components, is also decisive for the catalytic activity and for the polydispersity of the resulting polymers.

In the binary and ternary catalytic systems mentioned above, however, the percentage of neodymium catalytically active is relatively low, normally ranging from 7% to 8% (said percentage referring to the molar percentage of active neodymium with respect to the total moles of neodymium charged), as described, for example, by Marina N. G. et al., in "Doklady Akademii Nauk SSSR" (1982), Vol. 265, pages 1431-1433.

Much more active ternary catalytic systems, containing a higher percentage of catalytically active neodymium, have been obtained by reaction between allyl compounds of neodymium, obtained by reaction between the complex of neodymium chloride with tetrahydrofuran (THF) and allyl Grignard, and aluminium alkyl [e.g., aluminium trialkyl, methylaluminoxane (MAO), tetra-iso-butyl-aluminoxane (TIBAO)], as described, for example, in Italian patent IT 1,228,442; or by: Porri L. et al. in "Macromolecular Symposia" (1993), Vol. 66, pages 231-244; Porri L. et al. in "Polymer Preprints", "American Chemical Society Division Polymer Chemistry" (1998), Vol. 39, pages 214-215; Porri L. in "Recent developments in Lanthanide catalysts for 1,3-diene polymerization", in "ACS Symposium Series 749—Olefin Polymerization: Emerging Frontiers" (2000), P. Arjunan, J. C. McGrath and T. Hanlon Eds., Oxford University Press, USA, pages 15-30. Said ternary catalytic systems provide a polybutadiene having a much lower polydispersity than those obtained by means of the classical ternary catalytic systems mentioned above. Furthermore, said ternary catalytic systems can also produce polyisoprene and/or other polymers deriving from the (co)polymerization of substituted butadienes, providing (co)polymers with a high content of 1,4-cis units (i.e. content ≥90%). In particular, a polymer is obtained from the polymerization of isoprene, having a content of 1,4-cis units equal to about 94%, which can be advantageously used for producing elastomeric blends for the production of tyres.

As mentioned above, due to the fact that the (co)polymers of conjugated dienes, in particular polybutadiene and polyisoprene, with a high content of 1,4-cis units, are the polymers most widely used on an industrial scale, in particular for the production of tyres, the study of new catalytic systems capable of providing said (co)polymers, is still of great interest.

The Applicant has faced the problem of finding a new complex comprising lanthanides that can be used in a catalytic system capable of providing (co)polymers of conjugated dienes, in particular polybutadiene and polyisoprene, linear or branched, with a high content of 1,4-cis units, i.e. a content of 1,4-cis units ≥99% in the case of polybutadiene, and ≥98% in the case of polyisoprene. Furthermore, said polyisoprene has a glass transition temperature ($T_g$) similar to that of natural rubber.

An object of the present invention therefore relates to a bis-imine complex of lanthanides having general formula (I):

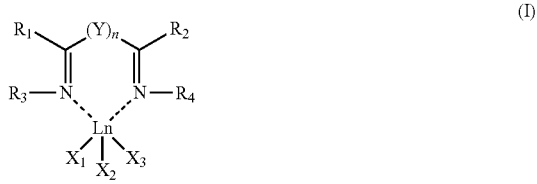

wherein:
- Ln represents a metal of the series of lanthanides, preferably selected from neodymium (Nd), lanthanum (La), praseodymium (Pr), gadolinium (Gd), europium (Eu), terbium (Tb), samarium (Sm), erbium (Er), ytterbium (Yb);
- n is 0 or 1;
- Y represents a —CHR group wherein R represents a hydrogen atom, or a linear or branched $C_1$-$C_{20}$, preferably $C_1$-$C_{15}$, alkyl group;
- $R_1$ and $R_2$, equal to or different from each other, represent a hydrogen atom; or they are selected from linear or branched $C_1$-$C_{20}$, preferably $C_1$-$C_{15}$, alkyl groups, cycloalkyl groups optionally substituted; or $R_1$ and $R_2$ can be optionally bound to each other so as to form, together with the other atoms to which they are bound, a saturated, unsaturated or aromatic cycle containing from 4 to 6 carbon atoms, optionally substituted with linear or branched $C_1$-$C_{20}$, preferably $C_1$-$C_{15}$, alkyl groups, said cycle optionally containing heteroatoms such as, for example, oxygen, sulfur, nitrogen, silicon, phosphorous, selenium;
- $R_3$ and $R_4$, equal to or different from each other, represent a hydrogen atom; or they are selected from linear or branched $C_1$-$C_{20}$, preferably $C_1$-$C_{15}$, alkyl groups, cycloalkyl groups optionally substituted, aryl groups optionally substituted;
- or $R_2$ and $R_4$ can be optionally bound to each other so as to form, together with the other atoms to which they are bound, a saturated, unsaturated or aromatic cycle containing from 3 to 6 carbon atoms, optionally substituted with linear or branched $C_1$-$C_{20}$, preferably $C_1$-$C_{15}$, alkyl groups, said cycle optionally containing other heteroatoms such as, for example, oxygen, sulfur, nitrogen, silicon, phosphorous, selenium;
- or $R_1$ and $R_3$ can be optionally bound to each other so as to form, together with the other atoms to which they are bound, a saturated, unsaturated or aromatic cycle containing from 3 to 6 carbon atoms, optionally substituted with linear or branched $C_1$-$C_{20}$, preferably $C_1$-$C_{15}$, alkyl groups, said cycle optionally containing other heteroatoms such as, for example, oxygen, sulfur, nitrogen, silicon, phosphorous, selenium;
- $X_1$, $X_2$ and $X_3$, equal to or different from each other, represent a halogen atom such as, for example, chlorine, bromine, iodine; or they are selected from linear or branched $C_1$-$C_{20}$, preferably $C_1$-$C_{15}$, alkyl groups, —OCOR$_5$ or —OR$_5$ groups wherein $R_5$ is selected from linear or branched $C_1$-$C_{20}$, preferably $C_1$-$C_{15}$, alkyl groups.

For the aim of the present description and of the following claims, the definitions of the numerical intervals always include the extremes, unless otherwise specified.

For the aim of the present description and of following claims, the term "metal belonging to the family of lanthanides" means any metal belonging to the Periodic Table of the Elements having an atomic number ranging from 57 to 71.

It should be noted that, for the aim of the present invention and of the following claims, the term "Periodic Table of the Elements" refers to the IUPAC version of the "Periodic Table of the Elements" dated Jun. 22, 2007, provided in the following Internet website www.iupac.org/reports/periodic_table.

The term "$C_1$-$C_{20}$ alkyl groups" refers to linear or branched alkyl groups having from 1 to 20 carbon atoms. Specific examples of $C_1$-$C_{20}$ alkyl groups are: methyl, ethyl, n-propyl, iso-propyl, n-butyl, sec-butyl, iso-butyl, tert-butyl, pentyl, hexyl, heptyl, octyl, n-nonyl, n-decyl, 2-butyloctyl, 5-methylhexyl, 4-ethylhexyl, 2-ethylheptyl, 2-ethylhexyl.

The term "cycloalkyl groups" refers to cycloalkyl groups having from 3 to 30 carbon atoms. Said cycloalkyl groups can be optionally substituted with one or more groups, equal to or different from each other, selected from: halogen atoms; hydroxyl groups; $C_1$-$C_{12}$ alkyl groups; $C_1$-$C_{12}$ alkoxyl groups; cyano groups; amino groups; nitro groups. Specific examples of cycloalkyl groups are: cyclopropyl, 2,2-difluorocyclopropyl, cyclobutyl, cyclopentyl, cyclohexyl, hexamethylcyclohexyl, pentamethylcyclo-pentyl, 2-cyclooctylethyl, methylcyclohexyl, methoxy-cyclohexyl, fluorocyclohexyl, phenylcyclohexyl.

The term "aryl groups" means aromatic carbocyclic groups. Said aromatic carbocyclic groups can be optionally substituted with one or more groups, equal to or different from each other, selected from: halogen atoms such as, for example, fluorine, chlorine, bromine; hydroxyl groups; $C_1$-$C_{12}$ alkyl groups; $C_1$-$C_{12}$ alkoxyl groups, cyano groups; amino groups; nitro groups. Specific examples of aryl groups are: phenyl, methylphenyl, trimethylphenyl, methoxyphenyl, hydroxyphenyl, phenyloxyphenyl, fluorophenyl, pentafluorophenyl, chlorophenyl, bromophenyl, nitrophenyl, dimethylaminophenyl, naphthyl, phenylnaphthyl, phenanthrene, anthracene.

The term "cyclo" relates to a system containing a ring containing from 3 to 6 carbon atoms, optionally also containing, in addition to the nitrogen atom, other heteroatoms selected from nitrogen, oxygen, sulfur, silicon, selenium, phosphorous. Specific examples of cyclo are: pyridine, thiadiazole.

According to a preferred embodiment of the present invention, in said bis-imine complex of lanthanides having general formula (I):
- Ln is neodymium (Nd), lanthanum (La), praseodymium (Pr), gadolinium (Gd);
- $R_1$ and $R_2$, the same as each other, are a hydrogen atom; or they are selected from linear or branched $C_1$-$C_{20}$ alkyl groups, and are preferably a methyl group; or they are selected from cycloalkyl groups optionally substituted;
- $R_3$ and $R_4$, equal to or different from each other, are selected from linear or branched $C_1$-$C_{20}$ alkyl groups, and are preferably an iso-propyl group; or they are selected from phenyl groups optionally substituted; or they are selected from cycloalkyl groups optionally substituted;
- $X_1$, $X_2$ and $X_3$, the same as each other, represent a halogen atom such as, for example, chlorine, bromine, iodine, preferably chlorine.

According to a preferred embodiment of the present invention, in said bis-imine complex of lanthanides having general formula (I):

- Ln is neodymium (Nd), lanthanum (La), praseodymium (Pr), gadolinium (Gd);
- $R_1$ and $R_3$ are bound to each other and together with the other atoms to which they are bound, form a pyridine;
- $R_2$ is a hydrogen atom; or it is selected from linear or branched $C_1$-$C_{20}$ alkyl groups, and is preferably a methyl group;
- $R_4$ is selected from phenyl groups optionally substituted; or it is selected from cycloalkyl groups optionally substituted;
- $X_1$, $X_2$ and $X_3$, the same as each other, are a halogen atom such as, for example, chlorine, bromine, iodine, preferably chlorine.

The bis-imine complex of lanthanides having general formula (I) is intended, according to the present invention, as being in any physical form such as, for example, isolated and purified solid form, solvated form with a suitable solvent, or supported on suitable organic or inorganic solids, preferably having a physical granular or powder form.

The bis-imine complex of lanthanides having general formula (I) is prepared starting from ligands known in the art.

Specific examples of ligands which can be used for the aim of the present invention are those having the following formulae (L1)-(L19):

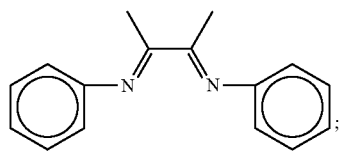
(L1)

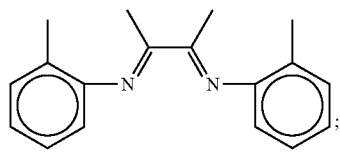
(L2)

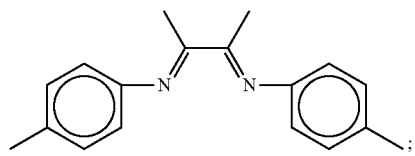
(L3)

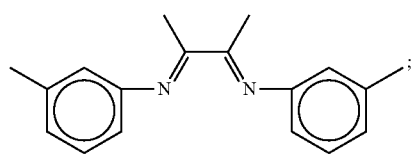
(L4)

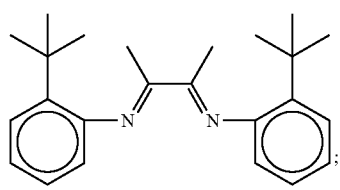
(L5)

-continued

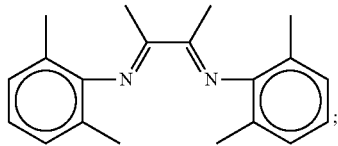
(L6)

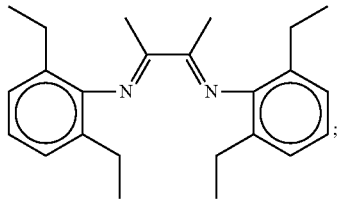
(L7)

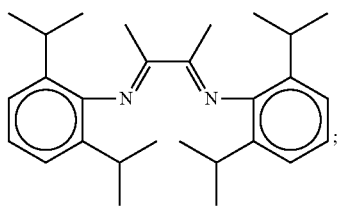
(L8)

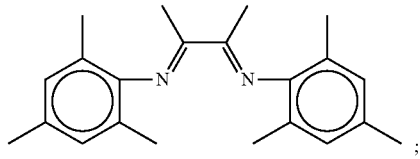
(L9)

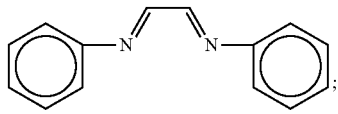
(L10)

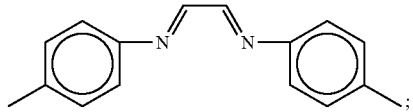
(L11)

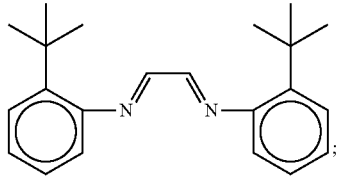
(L12)

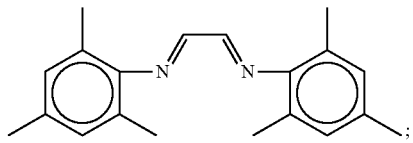
(L13)

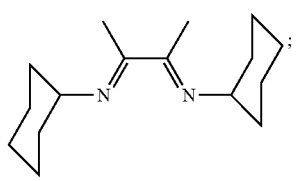
(L14)

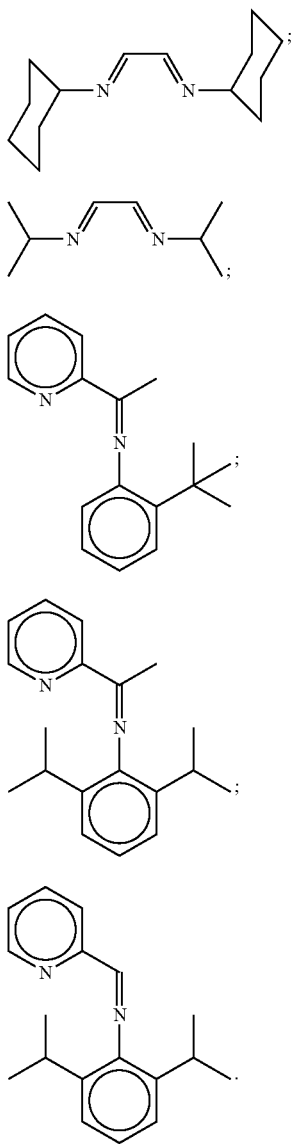

Said ligands having formulae (L1)-(L19), can be prepared by means of processes known in the art. Said ligands having formulae (L1)-(L19), can be prepared, for example:

by means of condensation reactions between primary amines and α,β-diketones as described, for example, by: van der Poel H. et al. in "Synthetic Communication" (1978), Vol. 8, page 305; Svoboda M. et al. in "Zeitschrift fuer Naturfoschung" (1981), Teil B, pages 814-822; Dieck H. et al. in "Zeitschrift fuer Naturfoschung" (1981), Teil B, pages 823-832; Dieck H. et al. in "Zeitschrift fuer Naturfoschung" (1975), Teil B, pages 922-925;

by means of condensation reactions between primary amines and glyoxals as described, for example, by: Kliegman J. M. et al. in "Tetrahedron" (1970), Vol. 26, pages 2555-2560; Kliegman J. M. et al. in "The Journal of Organic Chemistry" (1970), Vol. 35(9), pages 3140-3143; Barney V. C. et al. in "Journal of Chemical Society" (1953), pages 3610-3612; Horner L. et al. in "Chemische Berichte" (1957), Vol. 90, pages 2184-2189; Carson J. F. et al. in "Journal of the American Chemical Society" (1953), Vol. 75, pages 4337-4338;

by means of condensation reactions between primary amines and α-ketoaldehydes as described, for example, by: van der Poel H. et al. in "Synthetic Communication" (1978), Vol. 8, page 305; Svoboda M. et al. in "Zeitschrift fuer Naturfoschung" (1981), Teil B, pages 814-822; Dieck H. et al. in "Zeitschrift fuer Naturfoschung" (1981), Teil B, pages 823-832.

The bis-imine complex of lanthanides having general formula (I) can be prepared according to processes known in the art for the preparation of analogous complexes of other metals such as, for example, cobalt, nickel. Said bis-imine complex of lanthanides can be prepared, for example, by reaction between compounds of lanthanides having general formula $Ln(X)_3$ wherein Ln and X have the same meanings described above, as such or complexed with ethers [for example, diethyleter, tetrahydrofuran (THF), dimethoxyethane], with ligands having formulae (L1)-(L19) indicated above, in a molar ratio ligand (L)/lanthanide (Ln) ranging from 1 to 1.5, preferably operating in the presence of at least one ether solvent [for example, tetrahydrofuran (THF)], at room temperature or higher. The bis-imine complex of lanthanides thus obtained can be subsequently recovered by means of methods known in the art such as, for example, precipitation by means of a non-solvent (for example, pentane), followed by separation by filtration or decanting and optional subsequent solubilization in a suitable solvent followed by low-temperature crystallization.

For the aim of the present description and of the following claims, the phrase "room temperature" means a temperature ranging from 20° C. to 25° C.

As specified above, the present invention also relates to a catalytic system for the (co)polymerization of conjugated dienes comprising said bis-imine complex of lanthanides having general formula (I).

A further object of the present invention therefore relates to a catalytic system for the (co)polymerization of conjugated dienes comprising:
(a) at least one bis-imine complex of lanthanides having general formula (I);
(b) at least one co-catalyst selected from:
  ($b_1$) aluminium alkyls having general formula (II):

$$Al(X')_n(R_6)_{3-n} \qquad (II)$$

wherein X' represents a halogen atom such as, for example, chlorine, bromine, iodine, fluorine; $R_6$ is selected from linear or branched $C_1$-$C_{20}$ alkyl groups, $C_3$-$C_{20}$ cycloalkyl groups, aryl groups, said groups being optionally substituted with one or more silicon or germanium atoms; and n is an integer ranging from 0 to 2;

($b_2$) aluminoxanes having general formula (III):

$$(R_7)_2\text{—Al—O—[—Al}(R_8)\text{—O—}]_p\text{—Al—}(R_9)_2 \qquad (III)$$

wherein $R_7$, $R_8$ and $R_9$, equal to or different from each other, represent a hydrogen atom, a halogen atom such as, for example, chlorine, bromine, iodine, fluorine; or they are selected from linear or branched $C_1$-$C_{20}$ alkyl groups, $C_3$-$C_{20}$ cycloalkyl groups, aryl groups, said groups being optionally substituted with one or more silicon or germanium atoms; and p is an integer ranging from 0 to 1000;

($b_3$) compounds having general formula (IV):

$$D^+E^- \qquad (IV)$$

wherein $D^+$ represents a Brønsted acid capable of donating a proton and of reacting irreversibly with the substituent X of the bis-imine complex of lanthanides having general formula (I); E⁻ represents a compatible anion capable of stabilizing the active catalytic species which are generated by the reaction of the two components and which is sufficiently labile as to be able to be removed by an olefinic monomer, preferably a boron atom, even more preferably an anion having formula $B(Ar)_4^{(-)}$ wherein the substituents Ar, equal to or different from each other, are selected from aryl groups such as, for example, phenyl, pentafluorophenyl, bis (trifluoromethyl)phenyl.

Specific examples of aluminium alkyls ($b_1$) which are particularly useful for the aim of the present invention are: tri-methyl-aluminium, tri-(2,3,3-tri-methyl-butyl)-aluminium, tri-(2,3-di-methyl-hexyl)-aluminium, tri-(2,3-di-methyl-butyl)-aluminium, tri-(2,3-di-methyl-pentyl)-aluminium, tri-(2,3-di-methyl-heptyl)-aluminium, tri-(2-methyl-3-ethyl-pentyl)-aluminium, tri-(2-methyl-3-ethyl-hexyl)-aluminium, tri-(2-methyl-3-ethyl-heptyl)-aluminium, tri-(2-methyl-3-propyl-hexyl)-aluminium, tri-ethyl-aluminium, tri-(2-ethyl-3-methyl-butyl)-aluminium, tri-(2-ethyl-3-methyl-pentyl)-aluminium, tri-(2,3-di-ethyl-pentyl-aluminium), tri-n-propyl-aluminium, tri-iso-propyl-aluminium, tri-(2-propyl-3-methyl-butyl)-aluminium, tri-(2-iso-propyl-3-methyl-butyl)-aluminium, tri-n-butyl-aluminium, tri-iso-butyl-aluminium (TIBA), tri-tert-butyl-aluminium, tri-(2-iso-butyl-3-methyl-pentyl)-aluminium, tri-(2,3,3-tri-methyl-pentyl)-aluminium, tri-(2,3,3-tri-methyl-hexyl)-aluminium, tri-(2-ethyl-3,3-di-methyl-butyl)-aluminium, tri-(2-ethyl-3,3-di-methyl-pentyl)-aluminium, tri-(2-iso-propyl-3,3-dimethyl-butyl)-aluminium, tri-(2-tri-methylsilyl-propyl)-aluminium, tri-2-methyl-3-phenyl-butyl)-aluminium, tri-(2-ethyl-3-phenyl-butyl)-aluminium, tri-(2,3-di-methyl-3-phenyl-butyl)-aluminium, tri-(2-phenyl-propyl)-aluminium, tri-[2-(4-fluoro-phenyl)-propyl]-aluminium, tri-[2-(4-chloro-phenyl)-propyl]-aluminium, tri-[2-(3-iso-propyl-phenyl-tri-(2-phenyl-butyl)-aluminium, tri-(3-methyl-2-phenyl-butyl)-aluminium, tri-(2-phenyl-pentyl)-aluminium, tri-[2-(penta-fluoro-phenyl)-propyl]-aluminium, tri-(2,2-diphenyl-ethyl]-aluminium, tri-(2-phenyl-methyl-propyl]-aluminium, tri-pentyl-aluminium, tri-hexyl-aluminium, tri-cyclohexyl-aluminium, tri-octyl-aluminium, di-ethyl-aluminium hydride, di-n-propyl-aluminium hydride, di-n-butyl-aluminium hydride, di-iso-butyl-aluminium hydride (DIBAH), di-hexyl-aluminium hydride, di-iso-hexyl-aluminium hydride, di-octyl-aluminium hydride, di-iso-octyl-aluminium hydride, ethyl-aluminium di-hydride, n-propyl-aluminium di-hydride, iso-butyl-aluminium di-hydride, di-ethyl-aluminium chloride, mono-ethyl-aluminium dichloride, di-methyl-aluminium chloride, di-isobutyl-aluminium chloride, iso-butyl-aluminium dichloride, ethyl-aluminium sesquichloride, and also the corresponding compounds in which one of the hydrocarbon substituents is substituted with a hydrogen atom and those in which one or two of the hydrocarbon substituents are substituted with an iso-butyl group. Tri-iso-butyl-aluminium (TIBA), di-iso-butyl-aluminium hydride (DIBAH), are particularly preferred.

Specific examples of aluminoxanes ($b_2$) which are particularly useful for the aim of the present invention are: methylaluminoxane (MAO), ethyl-aluminoxane, n-butyl-aluminoxane, tetra-iso-butyl-aluminoxane (TIBAO), tert-butyl-aluminoxane, tetra-(2,4,4-tri-methyl-pentyl)-aluminoxane (TIOAO), tetra-(2,3-di-methyl-butyl)-aluminoxane (TDMBAO), tetra-(2,3,3-tri-methyl-butyl)-aluminoxane (TDMBAO). Methylaluminoxane (MAO), tetra-iso-butyl-aluminoxane (TIBAO), are particularly preferred. Said aluminoxanes can be prepared according to processes known in the art. Said aluminoxanes can be prepared, for example, by reacting at least one tri-alkyl-aluminium or at least one di-alkyl aluminium monochloride with water or with a salt containing crystallization water such as, for example, copper sulfate pentahydrate, aluminium sulfate hexadecahydrate, in the presence of at least one organic solvent such as, for example, benzene, toluene, xylene.

Specific examples of compounds ($b_3$) having general formula (IV) which are particularly useful for the aim of the present invention are: tetrakis-pentafluorophenyl-borate tributylammonium-tetrakis-pentafluorophenyl-aluminate, tributylammonium-tetrakis-[(3,5-di-(trifluorophenyl)]-borate, tributylammonium-tetrakis-(4-fluorophenyl)]-borate, N,N-dimethylbenzyl-ammonium-tetrakis-pentafluorophenyl-borate, N,N-di-methyl-hexylammonium-tetrakis-pentafluorophenyl-borate, N,N-dimethylanilinium-tetrakis-(pentafluorophenyl)-borate, N,N-dimethylanilinium-tetrakis-(pentafluorophenyl)-aluminate, di-(propyl)-ammonium-tetrakis-(pentafluorophenyl)-borate, di-(cyclohexyl)-ammonium-tetrakis-(pentafluorophenyl)-borate, tri-phenyl-carbenium-tetrakis-(pentafluorophenyl)-borate, tri-phenylcarbenium-tetrakis-(penta-fluorophenyl)-aluminate. Tetrakis-pentafluorophenyl-borate is preferred.

Alternatively, the compounds ($b_3$) can be selected from compounds having formula $B(Ar)_3$ wherein Ar has the same meanings described above; or from compounds having formula $B(Ar)_3P$ wherein Ar has the same meanings described above and P is a pyrrole radical optionally substituted.

Further details relating to aluminium alkyls ($b_1$), aluminoxanes ($b_2$) and compounds ($b_3$), can be found in international patent application WO 2011/061151.

For the aim of the present description and of the following claims, the term "moles" and "molar ratio" are used with reference to compounds consisting of molecules and also with reference to atoms and ions, omitting, for the latter, the terms gram atom or atomic ratio, even if scientifically more correct.

According to a preferred embodiment of the present invention, in said catalytic system, the molar ratio between the lanthanide present in the bis-imine complex of lanthanides (a) having general formula (I) and the aluminium present in the co-catalyst (b) selected from aluminium alkyls ($b_1$) or aluminoxanes ($b_2$), can range from 5 to 5,000, preferably from 10 to 1,000.

According to a preferred embodiment of the present invention, in said catalytic system, the molar ratio between the lanthanide present in the bis-imine complex of lanthanides (a) having general formula (I) and the boron present in the co-catalyst (b) selected from compounds ($b_3$) having general formula (IV), can range from 0.1 to 15, preferably from 0.5 to 10.

For the aim of the present invention, other additives or components can be optionally added to the above catalytic system in order to adapt it so as to satisfy specific practical requirements. The catalytic systems thus obtained should therefore be considered as being included in the scope of the present invention. Additives and/or components which can be added in the preparation and/or formulation of the catalytic system object of the present invention are, for example, inert solvents, such as, for example, aliphatic and/or aromatic hydrocarbons; aliphatic and/or aromatic ethers; weakly coordinating additives (e.g., Lewis bases) selected, for example, from non-polymerizable olefins; sterically hindered or electronically poor ethers; halogenating agents such as, for example, silicon halides, halogenated hydrocarbons, preferably chlorinated; or mixtures thereof.

Said catalytic system can be prepared according to methods known in the art.

Said catalytic system, for example, can be prepared separately (preformed) and subsequently introduced into the (co)polymerization environment. In this respect, said catalytic system can be prepared by reacting at least one bis-imine complex of lanthanides (a) having general formula (I) with at least one co-catalyst (b), optionally in the presence of other additives or components selected from those listed above, in the presence of a solvent such as, for example, toluene, heptane, at a temperature ranging from 20° C. to 60° C., for a time ranging from 10 seconds to 10 hours, preferably from 30 seconds to 5 hours. More details on the preparation of said catalytic system can be found in the examples provided hereunder.

Alternatively, said catalytic system can be prepared in situ, i.e. directly in the (co)polymerization environment. In this respect, said catalytic system can be prepared by introducing the bis-imine complex of lanthanides (a) having general formula (I), the co-catalyst (b) and the preselected conjugated diene(s) to be (co)polymerized, separately, operating under the conditions in which the (co)polymerization is carried out.

For the aim of the present invention, the above catalytic systems can also be supported on inert solids, preferably consisting of silicon and/or aluminium oxides, such as, for example, silica, alumina or silico-aluminates. The known supporting techniques can be used for supporting said catalytic systems, generally comprising the contact, in a suitable inert liquid medium, between the carrier, optionally activated by heating to temperatures higher than 200° C., and one or both of components (a) and (b) of the catalytic system object of the present invention. For the aim of the present invention, it is not necessary for both components to be supported, as the bis-imine complex of lanthanides (a) having general formula (I) only, or the co-catalyst (b) only, can be present on the surface of the carrier. In the latter case, the missing component on the surface is subsequently put in contact with the supported component, at the moment in which the catalyst active for the polymerization is to be formed.

The bis-imine complex of lanthanides having general formula (I), and the catalytic systems based thereon, which have been supported on a solid by the functionalization of the latter and the formation of a covalent bond between the solid and the bis-imine complex of lanthanides having general formula (I), are also included in the scope of the present invention.

The present invention also relates to a process for the (co)polymerization of conjugated dienes, characterized in that it uses said catalytic system.

The quantity of bis-imine complex of lanthanides (a) having general formula (I) and of co-catalyst (b) that can be used in the (co)polymerization of conjugated dienes varies according to the (co)polymerization process to be carried out. Said quantity is in any case such as to obtain a molar ratio between the lanthanide present in the bis-imine complex of lanthanides (a) having general formula (I) and the metal present in the co-catalyst (b), i.e. aluminium when the co-catalyst (b) is selected from aluminium alkyls ($b_1$) or aluminoxanes ($b_2$), boron when the co-catalyst (b) is selected from compounds ($b_3$) having general formula (IV), comprised within the values indicated above.

Specific examples of conjugated dienes which can be (co)polymerized using the catalytic system according to the present invention are: 1,3-butadiene, 2-methyl-1,3-butadiene (isoprene), 2,3-dimethyl-1,3-butadiene, 1,3-pentadiene, 1,3-hexadiene, cyclo-1,3-hexadiene. Preferred (co)polymerizable conjugated dienes are 1,3-butadiene, isoprene. The above (co)polymerizable conjugated dienes can be used alone, or in a mixture of two or more dienes. In the latter case, i.e. using a mixture of two or more dienes, a copolymer is obtained.

According to a particularly preferred embodiment, the present invention relates to a polymerization process of 1,3-butadiene or isoprene, characterized in that it uses said catalytic system.

Said (co)polymerization is generally carried out in the presence of a polymerization solvent generally selected from inert organic solvents such as, for example, saturated aliphatic hydrocarbons such as, for example, butane, pentane, hexane, heptane, or mixtures thereof; saturated cyclo-aliphatic hydrocarbons such as, for example, cyclopentane, cyclohexane, or mixtures thereof; mono-olefins such as, for example, 1-butene, 2-butene, or mixtures thereof; aromatic hydrocarbons such as, for example, benzene, toluene, xylene, or mixtures thereof; halogenated hydrocarbons such as, for example, methylene chloride, chloroform, carbon tetrachloride, trichloroethylene, perchloroethylene, 1,2-dichloroethane, chlorobenzene, bromobenzene, chlorotoluene, or mixtures thereof. The (co)polymerization solvent is preferably selected from saturated aliphatic hydrocarbons.

Alternatively, said (co)polymerization can be carried out using, as (co)polymerization solvent, the same conjugated diene(s) to be (co)polymerized, according to the process known as "bulk process".

The concentration of conjugated diene to be (co)polymerized in said (co)polymerization solvent generally ranges from 5% by weight to 50% by weight, preferably from 10% by weight to 20% by weight, with respect to the total weight of the conjugated diene/solvent mixture.

Generally, said (co)polymerization can be carried out at a temperature ranging from −70° C. to +100° C., preferably from −20° C. to +80° C.

As far as the pressure is concerned, it is preferable to operate at the pressure of the components of the mixture to be (co)polymerized.

Said (co)polymerization can be carried out either in continuous or batchwise.

As indicated above, the use of the bis-imine complex of lanthanides having general formula (I) allows (co)polymers of conjugated dienes to be obtained, in particular linear or branched polybutadiene and polyisoprene, with a high content of 1,4-cis units, i.e. a content of 1,4-cis units ≥99% in the case of polybutadiene, and ≥98% in the case of polyisoprene.

Some illustrative and non-limiting examples are provided hereunder for a better understanding of the present invention and for its practical embodiment.

EXAMPLES

Reagents and Materials

The reagents and materials used in the following examples of the invention are indicated in the following list, together with their optional pretreatments and their supplier:

aniline (Aldrich): used as such;

neodymium trichloride/tetrahydrofuran complex [$NdCl_3$(2THF)]: obtained by the extraction of neodymium trichloride ($NdCl_3$) (Strem Chemicals) with tetrahydrofuran (THF) at boiling point, as described by Yang J. H. et al., in "Macromolecules" (1982), Vol. 15(2), pages 230-233;

lanthanum trichloride ($LaCl_3$) (Strem Chemicals): used as such;

praseodymium trichloride ($PrCl_3$) (Strem Chemicals): used as such;

tetrahydrofuran (THF) (Carlo Erba, RPE): kept at reflux temperature on potassium/benzophenone and then distilled under nitrogen;

methanol (Carlo Erba, RPE): used as such;

ethanol (Carlo Erba, RPE): used as such;

formic acid (85%) (Carlo Erba, RPE): used as such;

2,3-butandione (Aldrich): used as such;

o-toluidine (Aldrich): used as such;

m-toluidine (Aldrich): used as such;

p-toluidine (Aldrich): used as such;

2-tert-butylaniline (Aldrich): used as such;

2,6-dimethylaniline (Aldrich): used as such;

2,4,6-trimethylaniline (Aldrich): used as such;

2,6-di-isopropylaniline (Aldrich): used as such;

2-pyridinecarboxyaldehyde (Aldrich): used as such;

cyclohexylamine (Aldrich): used as such;

acetylpyridine (Aldrich): used as such;

glyoxal (Aldrich): aqueous solution at 40%;

toluene (Aldrich): pure, ≥99.5%, distilled on sodium (Na) in an inert atmosphere;

1,3-butadiene (Air Liquide): pure, ≥99.5%, evaporated from the container before each production, dried by passing it through a column packed with molecular sieves and condensed inside the reactor pre-cooled to −20° C.;

isoprene (Aldrich): pure, ≥99%, refluxed on calcium hydride, then distilled "trap-to-trap" and kept in a nitrogen atmosphere;

tetra-iso-butyl-aluminoxane (TIBAO) (Akzo Nobel): cyclohexane solution at 10% by weight;

methylaluminoxane (MAO) (Aldrich): toluene solution at 10% by weight;

di-iso-butyl-aluminium hydride (DIBAH) (Aldrich): used as such;

Nd-2-ethylhexanoate [$Nd(OCOC_{17}H_{15})_3$] (Aldrich): 0.05 M solution in heptane;

heptane (Aldrich): pure, ≥99%, distilled on sodium (Na) in an inert atmosphere;

pentane (Aldrich): pure, ≥99%, distilled on sodium (Na) in an inert atmosphere;

di-ethyl aluminium chloride [$AlEt_2Cl$] (Schering AG): used as such;

tri-iso-butyl aluminium [TIBA] (Schering AG): used as such;

deuterated tetrachloroethylene ($C_2D_2Cl_4$) (Acros): used as such;

deuterated chloroform deuterato ($CDCl_3$) (Acros): used as such.

The analysis and characterization methods indicated below were used.

Elemental Analysis a) Determination of Nd, La, Pr

For the determination of the weight quantity of the metals Nd, La and Pr, in the bis-imine complexes of lanthanides object of the present invention, an aliquot weighed exactly, operating in a dry-box under a nitrogen flow, of about 30-50 mg of sample, was placed in a platinum crucible of about 30 ml, together with a mixture of 1 ml of hydrofluoric acid (HF) at 40%, 0.25 ml of sulfuric ($H_2SO_4$) at 96% and 1 ml of nitric acid ($HNO_3$) at 70%. The crucible was then heated on a plate, increasing the temperature until the appearance of white sulfuric fumes (about 200° C.). The mixture thus obtained was cooled to room temperature (20° C.-25° C.), 1 ml of nitric acid ($HNO_3$) at 70% was added and the mixture was then heated until the appearance of fumes. After repeating the above sequence a further two times, a limpid, almost colourless solution was obtained. 1 ml of nitric acid ($HNO_3$) and about 15 ml of water were then added, without heat, and the mixture was then heated to 80° C. for about 30 minutes. The sample thus prepared was diluted with water, having a MilliQ purity, up to a weight of about 50 g, weighed exactly, to obtain a solution on which analytical instrumental determination was carried out using an ICP-OES (optical detection plasma) Thermo Optek IRIS Advantage Duo spectrometer, by comparison with solutions at a known concentration. For this aim, a calibration line was prepared for each analyte, within the range of 0 ppm-10 ppm, measuring solutions having a known titre obtained by weight dilution of certified solutions.

The solution of the sample prepared as described above was diluted again by weight so as to obtain concentrations close to those used as reference, before carrying out spectrophotometric analysis. All the samples were prepared in duplicate. The results were considered acceptable if the single data of the tests in duplicate did not differ by more than 2% relative with respect to their average value.

b) Chlorine Determination

For this aim, samples of the bis-imine complexes of lanthanides object of the present invention, about 30 mg-50 mg, were weighed exactly in 100 ml glasses in a dry-box under a stream of nitrogen. 2 g of sodium carbonate ($Na_2CO_3$) and, outside the dry-box, 50 ml of MilliQ water, were added. The mixture was brought to boiling point, on a plate under magnetic stirring, for about 30 minutes. It was left to cool, sulfuric acid ($H_2SO_4$) diluted 1/5, was added until the reaction became acid and the mixture was titrated with silver nitrate ($AgNO_3$) 0.1N with a potentiometer titrimeter.

c) Determination of Carbon, Hydrogen and Nitrogen

The determination of the carbon, hydrogen and nitrogen, in the bis-imine complexes of lanthanides object of the present invention, and also in the ligands used for the aim of the present invention, was carried out by means of an automatic analyzer Carlo Erba Mod. 1106.

$^{13}C$-HMR and $^1H$-HMR Spectra

The $^{13}C$-HMR and $^1H$-HMR spectra were registered by means of a nuclear magnetic resonance spectrometer mod. Bruker Avance 400, using deuterated tetrachloroethylene ($C_2D_2Cl_4$) at 103° C., and hexamethyldisiloxane (HDMS) as internal standard, or using deuterated chloroform ($CDCl_3$), at 25° C., and tetramethylsilane (TMS) as internal standard. Polymeric solutions having concentrations equal to 10% by weight with respect to the total weight of the polymeric solution, were used for the aim.

The microstructure of the polymers [i.e. content of 1,4-cis units (%)] was determined by analysis of the above spectra on the basis of what is indicated in literature by Mochel, V. D., in "Journal of Polymer Science Part A-1: Polymer Chemistry" (1972), Vol. 10, Issue 4, pages 1009-1018, for polybutadiene; and by Sato, H., et al., in "Journal of Polymer Science: Polymer Chemistry Edition" (1979), Vol. 17, Issue 11, pages 3551-3558 for polyisoprene.

I.R. Spectra

The I.R. spectra (FT-IR) were registered by means of a Bruker IFS 48 spectrophotometer.

The I.R. spectra (FT-IR) of the ligands used in the present invention were obtained by dispersing the ligand to be analyzed in anhydrous potassium bromide (KBr) (disks of KBr), or in a suspension of nujol.

The I.R. spectra (FT-IR) of the bis-imine complexes of lanthanides object of the present invention, were obtained by dispersing the bis-imine complex of lanthanides to be analyzed in anhydrous potassium bromide (KBr) (disks of KBr), or in a suspension of nujol.

The I.R. spectra (FT-IR) of the polymers were obtained from polymeric films on tablets of potassium bromide (KBr), said films being obtained by deposition of a solution of the polymer to be analyzed in hot o-dichlorobenzene. The concentration of the polymeric solutions analyzed was equal to 10% by weight with respect to the total weight of the polymeric solution.

Thermal Analysis (DSC)

The DSC ("Differential Scanning Calorimetry") thermal analysis, for determining the melting point ($T_m$) and the crystallization temperature ($T_c$) of the polymers obtained, was carried out using a Perkin Elmer Pyris differential scanning calorimeter. For this aim, 5 mg of polymer were analyzed, with a scanning rate ranging from 1° C./min to 20° C./min, in an inert nitrogen atmosphere.

The DSC ("Differential Scanning Calorimetry") thermal analysis, for determining the glass transition temperature ($T_g$) of the polymers obtained and of the natural rubber (NR), was carried out by means of the above calorimeter, using the following thermal program: isotherm for 3 minutes at +70° C.; cooling from +70° C. to −90° C. at a rate of 10° C./min; isotherm for 3 min at −90° C.; heating from −90° C. to +70° C. at a rate of 10° C./min.

Molecular Weight Determination

The determination of the molecular weight (MW) of the polymers obtained was carried out by means of GPC ("Gel Permeation Chromatography") operating under the following conditions:

Agilent 1100 pump;
I.R. Agilent 1100 detector;
PL Mixed-A columns;
solvent/eluent: tetrahydrofuran (THF);
flow 1 ml/min;
temperature: 25° C.;
molecular mass calculation: Universal Calibration method.

The weight average molecular weight ($M_w$) and the polydispersity Index (PDI) corresponding to the $M_w/M_n$ ratio ($M_n$=number average molecular weight), are specified.

Determination of the Branching

The determination of the branching of the polymers obtained was carried out by means of the GPC/MALLS technique obtained by coupling a multi-angle light scattering detector (MALLS) with a traditional SEC/RI elution system, operating under the following conditions:

Agilent 1050 pump;
I.R. Agilent 1050 detector;
MALLS Dawn-DSP Wyatt detector—Technology, λ=632.8 nm;
PL GEL Mixed-A (×4) columns;
solvent/eluent: tetrahydrofuran (THF);
flow 1 ml/min;
temperature: 25° C.

Operating as described above, the absolute measurement can be contemporaneously carried out of the molecular weight and of the gyration radius of the macromolecules that are separated by the chromatographic system: the quantity of light scattered from a macromolecular species in solution can in fact be used directly for obtaining its molecular weight, whereas the angular variation in the scattering is directly correlated to its average dimensions. The fundamental relation which is used is represented by the following equation (1):

$$\frac{K^*c}{R_\theta} = \frac{1}{M_w P_\theta} + 2A_2 c \quad (1)$$

wherein:
$K^*$ is the optical constant which depends on the wave-length of the light used, the refraction index (dn/dc) of the polymer, the solvent used;
$M_w$ is the weight average molecular weight;
c is the concentration of the polymeric solution;
$R_\theta$ is the intensity of the light scattered, measured at the angle θ (excess Rayleigh factor);
$P_\theta$ is the function describing the variation of the light scattered with the angle at which it is measured, for an angle θ equal to 0;
$A_2$ is the second virial coefficient.

For very low concentrations (typical of a GPC system), the equation (1) indicated above is reduced to the following equation (2):

$$\frac{K^*c}{R_\theta} = \frac{1}{M_w P_\theta} \quad (2)$$

wherein $K^*$, c, $R_\theta$, $M_w$ and $P_\theta$, have the same meanings defined above, and by carrying out the measurement on several angles, the extrapolation to angle null of the function $K^*c/R_\theta$ in relation to $sen^2\theta/2$ directly provides the molecular weight from the intercept value and the gyration radius of the slope.

Furthermore, as this measurement is carried out for every slice of the chromatogram, it is possible to obtain a distribution of both the molecular weight and the gyration radius.

The macromolecular dimensions in solution are directly correlated to their branching degree: for the same molecular weight, the smaller the dimensions of the macromolecule with respect to the linear correspondent, the higher the branching degree will be.

Informations relating to the macrostructure of the polymer is qualitatively deduced from the value of the parameter α, which represents the slope of the curve which correlates the gyration radius with the molecular weight: when, under the same analysis conditions, this value decreases with respect to a macrostructure of the linear type, there is the presence of a polymer having a branched-type macrostructure. The typical value of the parameter α, for linear polybutadiene having a high content of 1,4-cis units, in tetrahydrofuran (THF), is equal to 0.58-0.60.

Example 1

Synthesis of the Ligand Having Formula (L1)

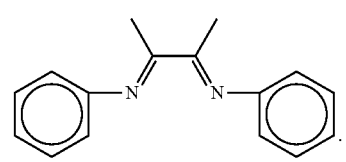

(L1)

A few drops of formic acid were added to a solution of 9.32 g (100 mmoles) of aniline in 100 ml of methanol, obtaining a yellow solution. A solution of 2,3-butandione (4.3 g-50 mmoles) in 50 ml of methanol was added, dropwise, under stirring, to said yellow solution.

The whole mixture was left, under stirring, at room temperature, for about 2 hours, until the formation of a yellow precipitate was observed. The mixture was left to rest for 14 hours and was subsequently filtered and dried under vacuum, at room temperature, obtaining 11.65 g of a yellowish solid (yield=98%), having formula (L1).

Figure 5:
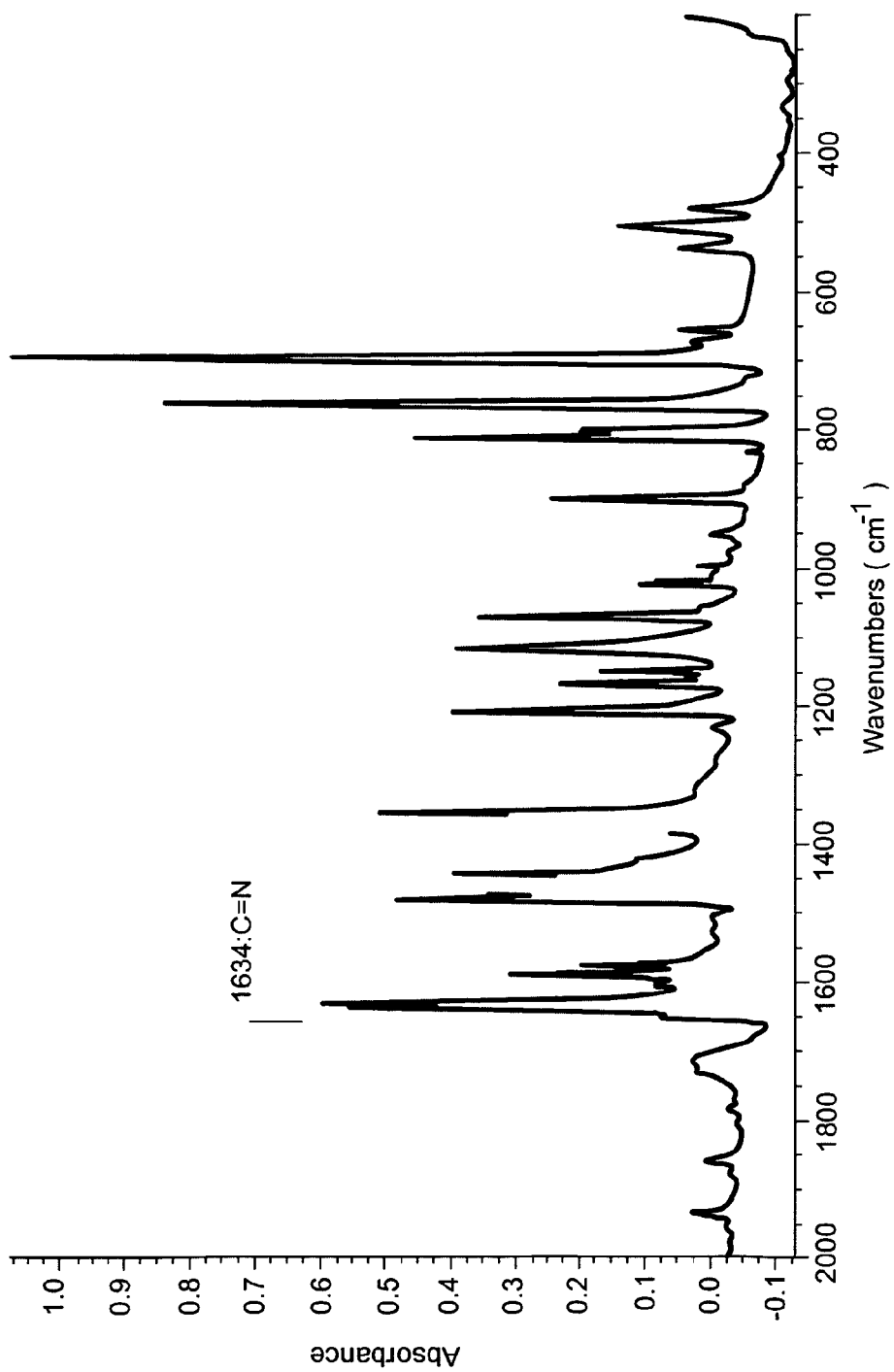
FIG. 5 illustrates FR-IR (nujol) spectrum of the ligand (L1) (Example 1).

Molecular weight (MW): 236.31.
Elemental analysis [found (calculated)]: C, 80.98% (81.2%); H, 6.82% (6.82%); N, 11.81% (11.85%).
FT-IR (nujol): 1634 cm$^{-1}$ $v_{(C=N)}$.
FIG. 5 shows the FT-IR (nujol) spectrum of the ligand having formula (L1) obtained.

Example 2

Synthesis of the Ligand Having Formula (L2)

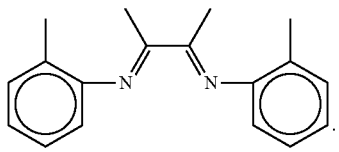
(L2)

A few drops of formic acid and 6 g of molecular sieves 4A were added to a solution of 4.3 g (50 mmoles) of 2,3-butandione in 50 ml of chloroform, obtaining a suspension. A solution of o-toluidine (10.7 g-100 mmoles) in 50 ml of chloroform was added, dropwise, under stirring, to said suspension cooled to 0° C.

At the end of the addition, the temperature was left to rise and the mixture was left, under stirring, at room temperature, for 24 hours. The molecular sieves where then eliminated by filtration and the chloroform removed by evaporation under vacuum obtaining a solid. The solid obtained was crystallized from methanol, obtaining 8.5 g of a yellow solid (yield=64%), having formula (L2).

FT-IR (nujol): 1641 cm$^{-1}$ $v_{(C=N)}$.
Molecular weight (MW): 264.37.
Elemental analysis [found (calculated)]: C, 81.18% (81.78. %); H, 7.59% (7.63%); N, 10.62% (10.6%).

Example 3

Synthesis of the Ligand Having Formula (L3)

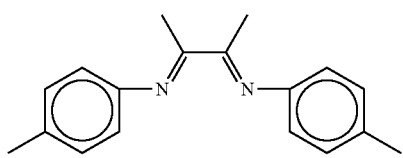
(L3)

A few drops of formic acid and 10 g of molecular sieves 4A were added to a solution of 8.6 g (100 mmoles) of 2,3-butandione in 100 ml of chloroform, obtaining a suspension. A solution of m-toluidine (21.42 g-200 mmoles) in 100 ml of chloroform was added, dropwise, under stirring, to said suspension cooled to 0° C.

At the end of the addition, the temperature was left to rise and the mixture was left, under stirring, at room temperature, for 24 hours. The molecular sieves where then eliminated by filtration and the chloroform removed by evaporation under vacuum obtaining a solid. The solid obtained was crystallized from methanol, obtaining 16.9 g of a yellow solid (yield=64%), having formula (L3).

FT-IR (nujol): 1643 cm$^{-1}$ $v_{(C=N)}$.
Molecular weight (MW): 264.37.
Elemental analysis [found (calculated)]: C, 81.554% (81.78. %); H, 7.58% (7.63%); N, 10.58% (10.6%).

Example 4

Synthesis of the Ligand Having Formula (L4)

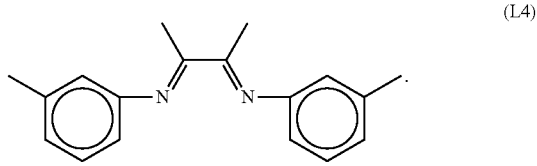
(L4)

A few drops of formic acid were added to a solution of 9.32 g (100 mmoles) of m-toluidine in 100 ml of methanol, obtaining a yellow solution. A solution of 2,3-butandione (4.3 g-50 mmoles) in 50 ml of methanol was added, dropwise, under stirring, to said solution.

The whole mixture was left, under stirring, at room temperature, for about 2 hours, until the formation of a yellow precipitate was observed. The mixture was left to rest for 14 hours and was subsequently filtered and dried under vacuum, at room temperature, obtaining 11.65 g of a yellowish solid (yield=98%), having formula (L4).

FT-IR (nujol): 1634 cm$^{-1}$ $v_{(C=N)}$.
Molecular weight (MW): 264.37.
Elemental analysis [found (calculated)]: C, 80.98% (81.2%); H, 6.82% (6.82%); N, 11.81% (11.85%).

Example 5

Synthesis of the Ligand Having Formula (L5)

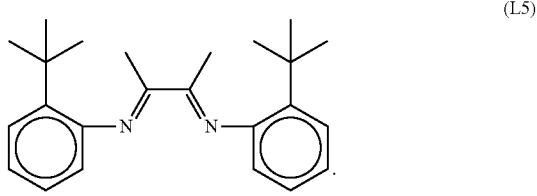
(L5)

A few drops of formic acid were added to a solution of 13.49 g (90 mmoles) of 2-tert-butylaniline in 50 ml of methanol, obtaining a yellow solution. A solution of 2,3-butandione (3.875 g-45 mmoles) in 30 ml of methanol was added, dropwise, under stirring, to said solution.

The whole mixture was left, under stirring, at room temperature, for about 2 hours, until the formation of a yellow precipitate was observed. The mixture was left to rest for 14 hours and was subsequently filtered and dried under vacuum, at room temperature, obtaining 14.1 g of a yellowish solid (yield=90%), having formula (L5).

FT-IR (nujol): 1636 cm$^{-1}$ $\nu_{(C=N)}$.

Molecular weight (MW): 348.53.

Elemental analysis [found (calculated)]: C, 81.95% (82.71%); H, 9.26% (9.25%); N, 8.02% (8.01%).

Example 6

Synthesis of the Ligand Having Formula (L6)

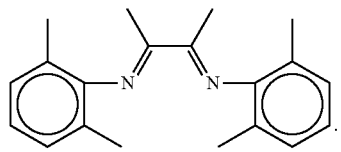

(L6)

A few drops of formic acid were added to a solution of 21.81 g (180 mmoles) of 2,6-dimethylaniline in 100 ml of methanol, obtaining a yellow solution. A solution of 2,3-butandione (7.75 g-90 mmoles) in 90 ml of methanol was added, dropwise, under stirring, to said solution.

The whole mixture was left, under stirring, at room temperature, for about 2 hours, until the formation of a yellow precipitate was observed. The mixture was left to rest for 14 hours and was subsequently filtered and dried under vacuum, at room temperature, obtaining 20.6 g of a yellowish solid (yield=98%), having formula (L6).

FT-IR (nujol): 1643 cm$^{-1}$ $\nu_{(C=N)}$.

Molecular weight (MW): 292.42.

Elemental analysis [found (calculated)]: C, 81.54% (82.15%); H, 8.25% (8.27%); N, 9.52% (9.58%).

Example 7

Synthesis of the Ligand Having Formula (L7)

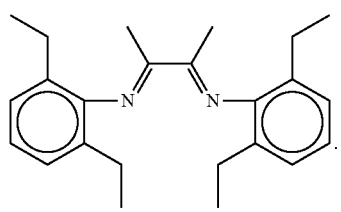

(L7)

A few drops of formic acid were added to a solution of 21.81 g (180 mmoles) of 2,6-dimethylaniline in 80 ml of methanol, obtaining a yellow solution. A solution of 2,3-butandione (7.75 g-90 mmoles) in 100 ml of methanol was added, dropwise, under stirring, to said solution.

The whole mixture was left, under stirring, at room temperature, for about 2 hours, until the formation of a yellow precipitate was observed. The mixture was left to rest for 14 hours and was subsequently filtered and dried under vacuum, at room temperature, obtaining 27 g of a yellowish solid (yield=86%), having formula (L7).

FT-IR (nujol): 1644 cm$^{-1}$ $\nu_{(C=N)}$.

Molecular weight (MW): 348.53.

Elemental analysis [found (calculated)]: C, 82.6% (82.71%); H, 9.29% (9.25%); N, 8.04% (8.04%).

Example 8

Synthesis of the Ligand Having Formula (L8)

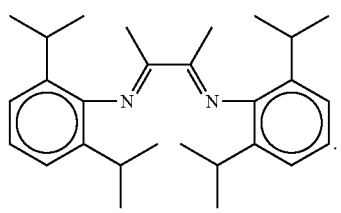

(L8)

A few drops of formic acid were added to a solution of 15.96 g (90 mmoles) of 2,6-dimethylaniline in 80 ml of methanol, obtaining a yellow solution. A solution of 2,3-butandione (3.875 g-45 mmoles) in 80 ml of methanol was added, dropwise, under stirring, to said solution.

The whole mixture was left, under stirring, at room temperature, for about 2 hours, until the formation of a yellow precipitate was observed. The mixture was left to rest for 14 hours and was subsequently filtered and dried under vacuum, at room temperature, obtaining 15.4 g of a yellowish solid (yield=84%), having formula (L8).

FT-IR (nujol): 1640 cm$^{-1}$ $\nu_{(C=N)}$.

Molecular weight (MW): 404.64.

Elemental analysis [found (calculated)]: C, 82.86% (83.11%); H, 9.97% (9.96%); N, 6.94% (6.92%).

Example 9

Synthesis of the Ligand Having Formula (L9)

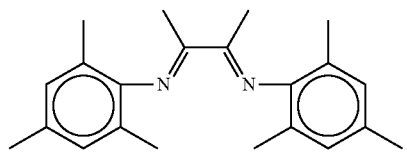

(L9)

A few drops of formic acid were added to a solution of 24.34 g (180 mmoles) of 2,4,6-trimethylaniline in 60 ml of methanol, obtaining a yellow solution. A solution of 2,3-butandione (7.75 g-90 mmoles) in 100 ml of methanol was added dropwise, under stirring, to said solution.

The whole mixture was left, under stirring, at room temperature, for about 2 hours, until the formation of a yellow precipitate was observed. The mixture was left to rest for 14 hours and was subsequently filtered and dried under vacuum, at room temperature, obtaining 27.25 g of a yellowish solid (yield=94.5%), having formula (L9).

FT-IR (nujol): 1636 cm$^{-1}$ $\nu_{(C=N)}$.

Molecular weight (MW): 320.48.

Elemental analysis [found (calculated)]: C, 81.62% (82.45%); H, 8.80% (8.81%); N, 8.66% (8.74%).

Example 10

Synthesis of the Ligand Having Formula (L10)

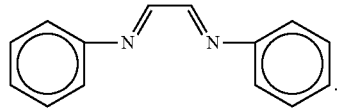
(L10)

9.32 g (100 mmoles) of aniline were dissolved in a mixture of methanol and distilled water (50 ml+100 ml). 7.26 g (50 mmoles) of glyoxal (aqueous solution at 40% by weight) were added to the solution thus obtained, cooled to 0° C. with a water/ice bath and under vigorous stirring. The solution obtained was left, under stirring, at room temperature, until the precipitation of a solid was obtained, which was filtered, washed with methanol, recrystallized from pentane and dried under vacuum, at room temperature, obtaining 9.41 g of a yellowish-coloured microcrystalline product (yield=90%) having formula (L10).

FT-IR (nujol): 1600 cm$^{-1}$ $\nu_{(C=N)}$.

Molecular weight (MW): 208.26.

Elemental analysis [found (calculated)]: C, 81.0% (80.74%); H, 5.7% (5.81%); N, 13.35% (13.45%).

Example 11

Synthesis of the Ligand Having Formula (L11)

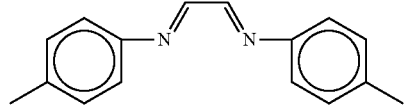
(L11)

10.72 g (100 mmoles) of p-toluidine were dissolved in a mixture of methanol and distilled water (50 ml+100 ml). 7.26 g (50 mmoles) of glyoxal (aqueous solution at 40% by weight) were added to the solution thus obtained, cooled to 0° C. with a water/ice bath and under vigorous stirring. The solution obtained was left, under stirring, at room temperature, until the precipitation of a solid was obtained, which was filtered, washed with methanol, recrystallized from pentane and dried under vacuum, at room temperature, obtaining 9.92 g of a yellowish-coloured microcrystalline product (yield=84%) having formula (L11).

FT-IR (nujol): 1612 cm$^{-1}$ $\nu_{(C=N)}$.

Molecular weight (MW): 236.31.

Elemental analysis [found (calculated)]: C, 81.2% (81.32%); H, 6.79% (6.82%); N, 11.83% (11.85%).

Example 12

Synthesis of the Ligand Having Formula (L12)

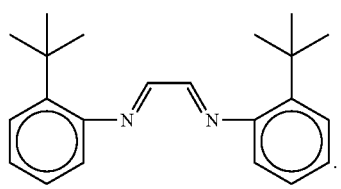
(L12)

14.924 g (100 mmoles) of 2-tert-butylaniline were dissolved in a mixture of methanol and distilled water (50 ml+100 ml). 7.26 g (50 mmoles) of glyoxal (aqueous solution at 40% by weight) were added to the solution thus obtained, cooled to 0° C. with a water/ice bath and under vigorous stirring. The solution obtained was left, under stirring, at room temperature, until the precipitation of a solid was obtained, which was filtered, washed with methanol, recrystallized from pentane and dried under vacuum, at room temperature, obtaining 12 g of a yellowish-coloured microcrystalline product (yield=75%) having formula (L12).

FT-IR (nujol): 1608 cm$^{-1}$ $\nu_{(C=N)}$.

Molecular weight (MW): 320.47.

Elemental analysis [found (calculated)]: C, 82.42% (82.45%); H, 8.80% (8.81%); N, 8.76% (8.74%).

Example 13

Synthesis of the Ligand Having Formula (L13)

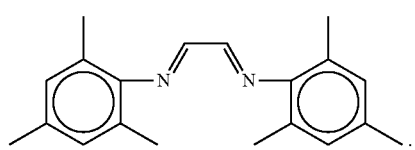
(L13)

13.52 g (100 mmoles) of 2,4,6-trimethylaniline were dissolved in a mixture of methanol and distilled water (50 ml+100 ml). 7.26 g (50 mmoles) of glyoxal (aqueous solution at 40% by weight) were added to the solution thus obtained, cooled to 0° C. with a water/ice bath and under vigorous stirring. The solution obtained was left, under stirring, at room temperature, until the precipitation of a solid was obtained, which was filtered, washed with methanol, recrystallized from pentane and dried under vacuum, at room temperature, obtaining 12 g of a yellowish-coloured microcrystalline product (yield=82%) having formula (L13).

FT-IR (nujol): 1616 cm$^{-1}$ $\nu_{(C=N)}$.

Molecular weight (MW): 292.42.

Elemental analysis [found (calculated)]: C, 82.0% (82.15%); H, 8.28% (8.27%); N, 9.5% (9.58%).

Example 14

Synthesis of the Ligand Having Formula (L14)

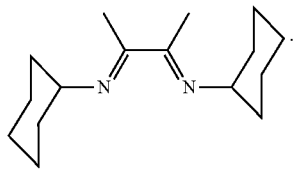

(L14)

A few drops of formic acid, 10 g of molecular sieves 4A were added to a solution of 4.56 g (46 mmoles) of cyclohexylamine in 50 ml of chloroform, and a solution of 2,3-butandione (1.98 g-23 mmoles) in 50 ml of chloroform was added, dropwise, under stirring.

The whole mixture was left, under stirring, at room temperature, for 24 hours. The molecular sieves where then eliminated by filtration and the chloroform removed by evaporation under vacuum obtaining a solid. The solid obtained was crystallized from methanol, filtered and dried under vacuum, at room temperature, obtaining 6 g of a white solid (yield=27%), having formula (L14).

FT-IR (nujol): 1636 cm$^{-1}$ $\nu_{(C=N)}$.

Molecular weight (MW): 248.41.

Elemental analysis [found (calculated)]: C, 77.30% (77.36%); H, 11.40% (11.36%); N, 11.31% (11.28%).

Example 15

Synthesis of the Ligand Having Formula (L15)

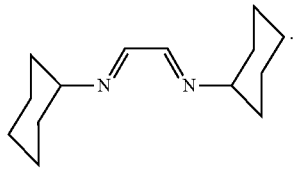

(L15)

9.92 g (100 mmoles) of cyclohexylamine were dissolved in a mixture of methanol and distilled water (50 ml+100 ml). 7.26 g (50 mmoles) of glyoxal (aqueous solution at 40% by weight) were added to the solution thus obtained, cooled to 0° C. with a water/ice bath and under vigorous stirring. The solution obtained was left, under stirring, at room temperature, until the precipitation of a solid was obtained, which was filtered, washed with methanol, recrystallized from pentane and dried under vacuum, at room temperature, obtaining 7.75 g of a white microcrystalline product (yield=70%) having formula (L15).

FT-IR (nujol): 1621 cm$^{-1}$ $\nu_{(C=N)}$.

Molecular weight (MW): 220.36.

Elemental analysis [found (calculated)]: C, 76.30% (76.31%); H, 10.99% (10.98%); N, 12.69% (12.71%).

Example 16

Synthesis of the Ligand Having Formula (L16)

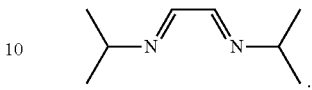

(L16)

5.9 g (100 mmoles) of 2,4,6-trimethylaniline were dissolved in a mixture of methanol and distilled water (50 ml+100 ml). 7.26 g (50 mmoles) of glyoxal (aqueous solution at 40% by weight) were added to the solution thus obtained, cooled to 0° C. with a water/ice bath and under vigorous stirring. The solution obtained was left, under stirring, at room temperature, until the precipitation of a solid was obtained, which was filtered, washed with methanol, recrystallized from pentane and dried under vacuum, at room temperature, obtaining 4.8 g of a white microcrystalline product (yield=68%) having formula (L16).

FT-IR (nujol): 1631 cm$^{-1}$ $\nu_{(C=N)}$.

Molecular weight (MW): 140.22.

Elemental analysis [found (calculated)]: C, 68.50% (68.52%); H, 11.51% (11.50%); N, 19.96% (19.98%).

Example 17

Synthesis of the Ligand Having Formula (L17)

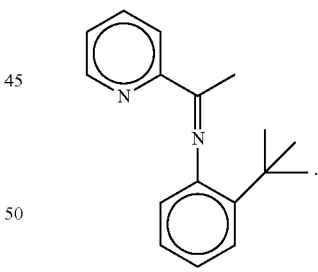

L17

10.09 g (90 mmoles) of acetylpyridine, 13.43 g (90 mmoles) of 2-tert-butylaniline and 0.25 ml of formic acid in 100 ml of methanol were charged into a flask equipped with a Dean-Stark apparatus: the whole mixture was left at reflux temperature for 8 hours. The solution thus obtained was evaporated under vacuum and the solid obtained was recrystallized from ethanol obtaining 7 g of a yellow microcrystalline product (yield=30.8%) having formula (L17).

FT-IR (nujol): 1640 cm$^{-1}$ $\nu_{(C=N)}$.

Molecular weight (MW): 252.35.

Elemental analysis [found (calculated)]: C, 81.0% (80.91%); H, 7.95% (7.99%); N, 10.99% (11.10%).

Example 18

Synthesis of the Ligand Having Formula (L18)

L18

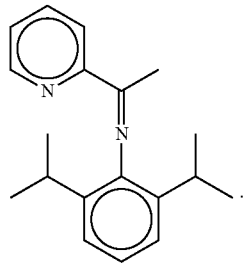

15.96 g (90 mmoles) of 2,6-di-iso-propylaniline were introduced into a flask together with 50 ml of methanol and 0.25 ml of formic acid. 50 ml of methanol containing 10.9 g (90 mmoles) of acetylpyridine were added, dropwise, to the solution thus obtained, at room temperature. The solution obtained was left under stirring at room temperature until the precipitation of a solid was obtained, which was filtered, washed with cold methanol and dried under vacuum, at room temperature, obtaining 12.6 g of a yellow microcrystalline product (yield=53%) having formula (L18).

FT-IR (nujol): 1652 cm$^{-1}$ $\nu_{(C=N)}$.

Molecular weight (MW): 280.41.

Elemental analysis [found (calculated)]: C, 81.52% (81.38%); H, 8.57% (8.63%); N, 9.90% (9.99%).

Example 19

Synthesis of the Ligand Having Formula (L19)

L19

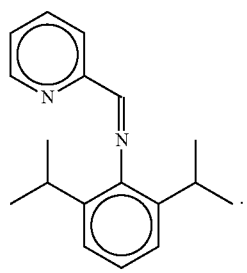

7.1 g (40 mmoles) of 2,6-di-iso-propylaniline and 4.3 g of 2-pyridinecarboxyaldehyde (40 mmoles) were heated to reflux temperature, in 50 ml of ethanol for 2.5 hours. The solution thus obtained was evaporated under vacuum and the solid obtained was crystallized from pentane obtaining 9 g of a yellow crystalline product (yield=98.5%) having formula (L19).

FT-IR (nujol): 1651 cm$^{-1}$ $\nu_{(C=N)}$.

Molecular weight (MW): 266.38.

Elemental analysis [found (calculated)]: C, 81.31% (81.16%); H, 8.21% (8.32%); N, 9.96% (10.52%).

Example 20

Synthesis of NdCl$_3$(L1)

Sample P1864

(P1864)

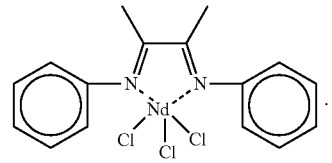

The complex neodymium trichloride/tetrahydrofuran [NdCl$_3$(2THF)] (1.48 g; 2.9 mmoles) was introduced into a 100 ml reaction flask and tetrahydrofuran (THF) (60 ml) was subsequently added. The whole mixture was kept under vigorous stirring, for a few minutes, obtaining a bluish suspension. The ligand having formula (L1) (0.76 g; 3.2 mmoles; molar ratio L1/Nd=1.1), obtained as described in Example 1, was then added, and the whole mixture was kept, under stirring, at room temperature, for 2 days. At the end of this period, an orange-brick-coloured suspension had been formed which was left to decant, obtaining a reddish-coloured supernatant. The whole mixture was dried under vacuum: the residue obtained was charged onto the porous septum of a heated extractor for solids and was extracted, in continuous, with pentane under heat for 24 hours, in order to remove the non-reacted ligand. The red-coloured residue remaining on the porous septum was recovered and dried under vacuum obtaining 1.32 g of a solid product corresponding to the complex NdCl$_3$(L1), equal to a conversion of 93% with respect to the neodymium charged.

Elemental analysis [found (calculated)]: C, 38.76% (39.47%); H, 3.15% (3.31%); N, 5.56% (5.75%); Cl, 21.5% (21.84); Nd, 29.4% (29.62%).

Molecular weight (MW): 486.91.

FT-IR (nujol): 1550 cm$^{-1}$ $\nu_{(C=N)}$.

Figure 6:
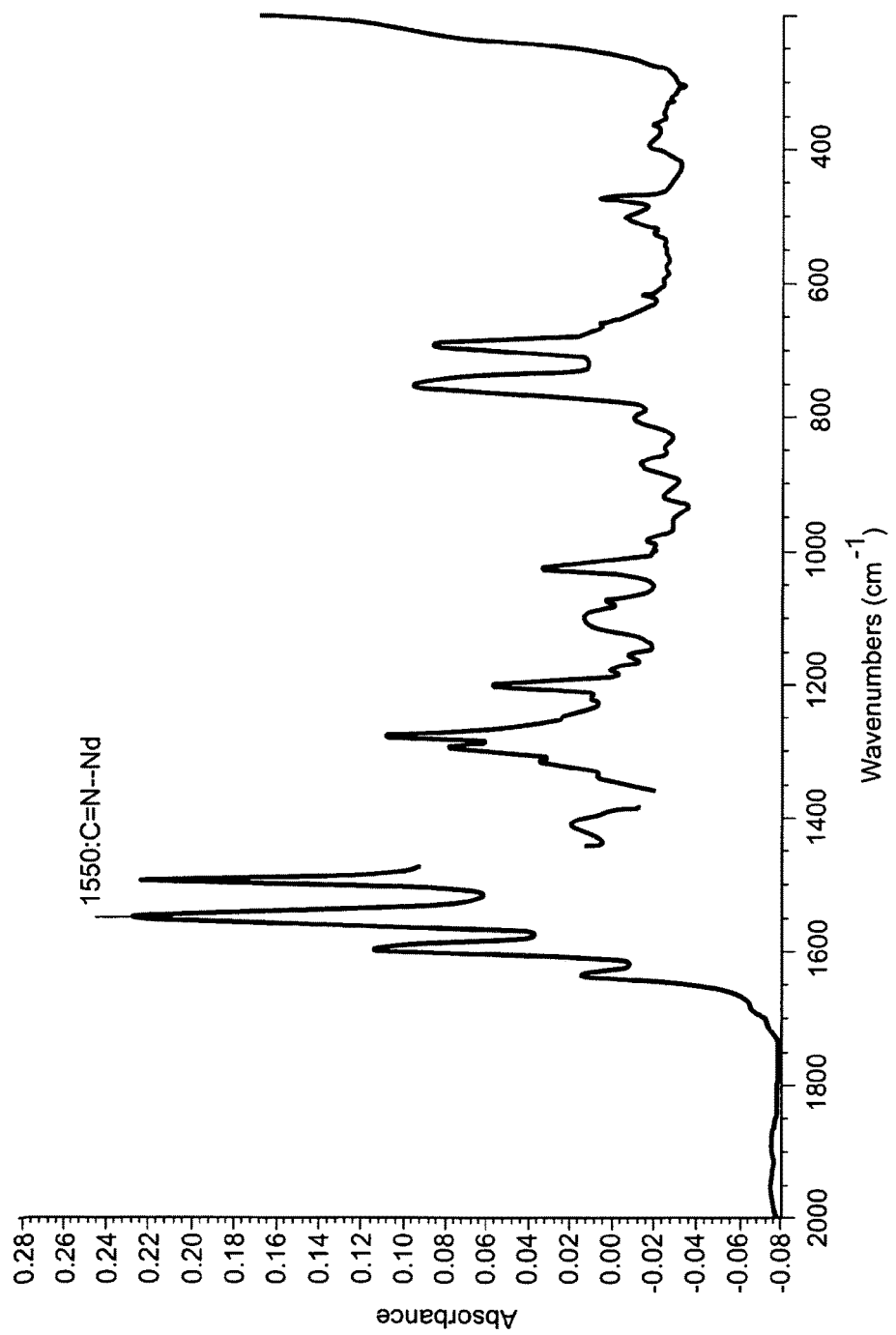
FIG. 6 illustrates FR-IR (nujol) spectrum of the complex NdCi$_3$(L1) (Example 20).

FIG. 6 shows the FT-IR (nujol) spectrum of the complex NdCl$_3$(L1) obtained.

Example 21

Synthesis of NdCl$_3$(L2)

Sample GL457

(GL457)

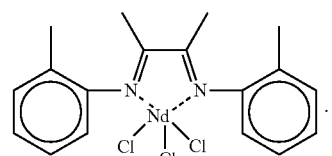

The complex neodymium trichloride/tetrahydrofuran [NdCl$_3$(2THF)] (1.05 g; 2.7 mmoles) was introduced into a 100 ml reaction flask together with 40 ml of tetrahydrofuran (THF). The whole mixture was kept under stirring, for a few minutes, at room temperature, and the ligand having formula (L2) (0.85 g; 3.2 mmoles; molar ratio L2/Nd=1.2) obtained as described in Example 2, dissolved in 20 ml of tetrahydrofuran (THF), was then added. The whole mixture was kept, under stirring, at room temperature, for 2 days. The solvent was then removed under vacuum and the residue obtained was dried under vacuum, at room temperature, obtaining a red solid which was charged onto the porous septum of a heated extractor for solids and was extracted, in continuous, with pentane at boiling point, for 24 hours, in order to remove the non-reacted ligand. The red-coloured residue remaining on the porous septum was recovered and dried under vacuum, at room temperature, obtaining 1.32 g of a solid product corresponding to the complex $NdCl_3(L2)$, equal to a conversion of 95% with respect to the neodymium charged.

Elemental analysis [found (calculated)]: C, 41.4% (41.98%); H, 3.7% (3.91%); N, 5.4% (5.44%); Cl, 20.8% (20.65%); Nd, 27.9% (28.01%).

Molecular weight (MW): 514.96.

FT-IR (nujol): 1552 cm$^{-1}$ $v_{(C=N)}$.

Example 22

Synthesis of $NdCl_3(L3)$

Sample GL455

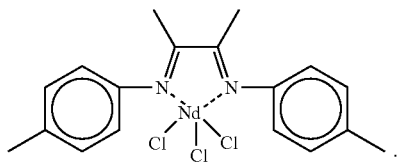

(GL455)

The complex neodymium trichloride/tetrahydrofuran [$NdCl_3(2THF)$] (0.63 g; 1.6 mmoles) was introduced into a 100 ml reaction flask together with 15 ml of tetrahydrofuran (THF). The whole mixture was kept, under stirring, for a few minutes, at room temperature, and the ligand having formula (L3) (0.46 g; 1.7 mmoles; molar ratio L3/Nd=1.2) obtained as described in Example 3, dissolved in 100 ml of tetrahydrofuran (THF), was then added. The whole mixture was kept, under stirring, at room temperature, for 2 days. The solvent was then removed under vacuum and the residue obtained was dried under vacuum, at room temperature, obtaining a brown/red solid which was charged onto the porous septum of a heated extractor for solids and was extracted, in continuous, with pentane at boiling point, for 24 hours, in order to remove the non-reacted ligand. The red-coloured residue remaining on the porous septum was recovered and dried under vacuum, at room temperature, obtaining 0.77 g of a solid product corresponding to the complex $NdCl_3(L3)$, equal to a conversion of 92.5% with respect to the neodymium charged.

Elemental analysis [found (calculated)]: C, 41.5% (41.98%); H, 3.7% (3.91%); N, 5.3% (5.44%); Cl, 20.5% (20.65%); Nd, 28.2% (28.01%).

Molecular weight (MW): 514.96.

FT-IR (nujol): 1551 cm$^{-1}$ $v_{(C=N)}$.

Example 23

Synthesis of $NdCl_3(L4)$

Sample P1822

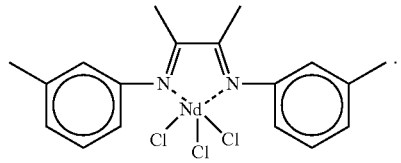

(P1822)

The complex neodymium trichloride/tetrahydrofuran [$NdCl_3(2THF)$] (1.18 g; 3 mmoles) was introduced into a 100 ml reaction flask together with 25 ml of tetrahydrofuran (THF). The whole mixture was kept under stirring, for a few minutes, at room temperature, and the ligand having formula (L4) (0.872 g; 3.3 mmoles; molar ratio L4/Nd=1.1) obtained as described in Example 4, dissolved in 20 ml of tetrahydrofuran (THF), was then added. The whole mixture was kept, under stirring, at room temperature, for 4 days. The solvent was then removed under vacuum and the residue obtained was dried under vacuum, at room temperature, obtaining a red solid which was charged onto the porous septum of a heated extractor for solids and was extracted, in continuous, with pentane at boiling point, for 24 hours, in order to remove the non-reacted ligand. The red-coloured residue remaining on the porous septum was recovered and dried under vacuum, at room temperature, obtaining 1.37 g of a solid product corresponding to the complex $NdCl_3(L4)$, equal to a conversion of 88.7% with respect to the neodymium charged.

Elemental analysis [found (calculated)]: C, 42.0% (41.98%); H, 3.65% (3.91%); N, 5.6% (5.44%); Cl, 20.3% (20.65%); Nd, 27.7% (28.01%).

Molecular weight (MW): 514.96.

FT-IR (nujol): 1550 cm$^{-1}$ $v_{(C=N)}$.

Example 24

Synthesis of $NdCl_3(L5)$

Sample P1819

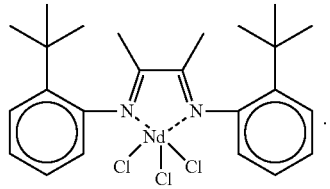

(P1819)

The complex neodymium trichloride/tetrahydrofuran [$NdCl_3(2THF)$] (0.90 g; 2.3 mmoles) was introduced into a 100 ml reaction flask together with 20 ml of tetrahydrofuran (THF). The whole mixture was kept under stirring, for a few minutes, at room temperature, and the ligand having formula (L5) (0.88 g; 2.5 mmoles; molar ratio L5/Nd=1.1) obtained as described in Example 5, dissolved in 15 ml of tetrahydrofuran (THF), was then added. The whole mixture was kept, under stirring, at room temperature, for 4 days. The solvent was then removed under vacuum and the residue obtained was dried under vacuum, at room temperature, obtaining a red solid which was charged onto the porous septum of a heated extractor for solids and was extracted, in continuous, with pentane at boiling point, for 24 hours, in order to remove the non-reacted ligand. The red-coloured residue remaining on the porous septum was recovered and dried under vacuum, at room temperature, obtaining 1.37 g of a solid product corresponding to the complex $NdCl_3(L5)$, equal to a conversion of 88.7% with respect to the neodymium charged.

Elemental analysis [found (calculated)]: C, 47.7% (48.11%); H, 5.2% (5.38%); N, 4.4% (4.68%); Cl, 18% (17.75%); Nd, 24.3% (24.07%).

Molecular weight (MW): 599.13.

FT-IR (nujol): 1555 cm$^{-1}$ $v_{(C=N)}$.

Example 25

Synthesis of $NdCl_3(L6)$

Sample P1820

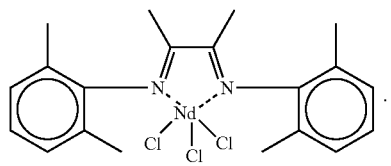
(P1820)

The complex neodymium trichloride/tetrahydrofuran $[NdCl_3(2THF)]$ (1.35 g; 3.4 mmoles) was introduced into a 100 ml reaction flask together with 30 ml of tetrahydrofuran (THF). The whole mixture was kept under stirring, for a few minutes, at room temperature, and the ligand having formula (L6) (1.15 g; 3.9 mmoles; molar ratio L6/Nd=1.1) obtained as described in Example 6, dissolved in 20 ml of tetrahydrofuran (THF), was then added. The whole mixture was kept, under stirring, at room temperature, for 10 days. The solvent was then removed under vacuum and the residue obtained was dried under vacuum, at room temperature, obtaining a red solid which was charged onto the porous septum of a heated extractor for solids and was extracted, in continuous, with pentane at boiling point, for 24 hours, in order to remove the non-reacted ligand. The red-coloured residue remaining on the porous septum was recovered and dried under vacuum, at room temperature, obtaining 1.73 g of a solid product corresponding to the complex $NdCl_3(L6)$, equal to a conversion of 85% with respect to the neodymium charged.

Elemental analysis [found (calculated)]: C, 43.9% (44.24%); H, 4.2% (4.45%); N, 4.8% (5.16%); Cl, 19.8% (19.59%); Nd, 26.8% (26.56%).

Molecular weight (MW): 543.02.

FT-IR (nujol): 1550 cm$^{-1}$ $v_{(C=N)}$.

Example 26

Synthesis of $NdCl_3(L7)$

Sample P1834

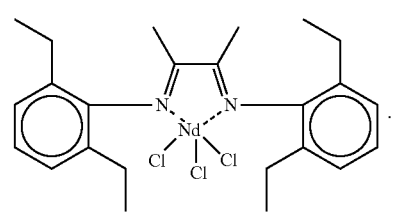
(P1834)

The complex neodymium trichloride/tetrahydrofuran $[NdCl_3(2THF)]$ (1.35 g; 3.4 mmoles) was introduced into a 100 ml reaction flask together with 30 ml of tetrahydrofuran (THF). The whole mixture was kept under stirring, for a few minutes, at room temperature, and the ligand having formula (L7) (1.43 g; 4.1 mmoles; molar ratio L7/Nd=1.2) obtained as described in Example 7, dissolved in 20 ml of tetrahydrofuran (THF), was then added. The whole mixture was kept, under stirring, at room temperature, for 10 days. The solvent was then removed under vacuum and the residue obtained was dried under vacuum, at room temperature, obtaining a red solid which was charged onto the porous septum of a heated extractor for solids and was extracted, in continuous, with pentane at boiling point, for 24 hours, in order to remove the non-reacted ligand. The red-coloured residue remaining on the porous septum was recovered and dried under vacuum, at room temperature, obtaining 2.26 g of a solid product corresponding to the complex $NdCl_3(L7)$, equal to a conversion of 92% with respect to the neodymium charged.

Elemental analysis [found (calculated)]: C, 47.8% (48.11%); H, 5.2% (5.38%); N, 4.5% (4.68%); Cl, 17.9% (17.75%); Nd, 24.3% (24.07%).

Molecular weight (MW): 599.13.

FT-IR (nujol): 1550 cm$^{-1}$ $v_{(C=N)}$.

Example 27

Synthesis of $NdCl_3(L8)$

Sample GL367

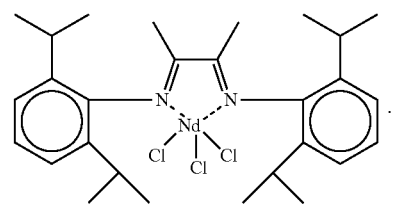
(GL367)

The complex neodymium trichloride/tetrahydrofuran $[NdCl_3(2THF)]$ (0.283 g; 6.97 mmoles) was introduced into a 100 ml reaction flask together with 20 ml of tetrahydrofuran (THF). The whole mixture was kept under stirring, for a few minutes, at room temperature, and the ligand having formula (L8) (0.3 g; 0.741 mmoles; molar ratio L8/Nd=1.15) obtained as described in Example 8, dissolved in 15 ml of tetrahydrofuran (THF), was then added. The whole mixture was kept, under stirring, at room temperature, for 10 days. The solvent was then removed under vacuum and the residue obtained was dried under vacuum, at room temperature, obtaining a red solid which was charged onto the porous septum of a heated extractor for solids and was extracted, in continuous, with pentane at boiling point, for 24 hours, in order to remove the non-reacted ligand. The red-coloured residue remaining on the porous septum was recovered and dried under vacuum, at room temperature, obtaining 0.41 g of a solid product corresponding to the complex NdCl$_3$(L8), equal to a conversion of 90% with respect to the neodymium charged.

Elemental analysis [found (calculated)]: C, 50.8% (51.33%); H, 5.9% (6.15%); N, 4.1% (4.28%); Cl, 16.4% (16.23%); Nd, 22.2% (22.01%).

Molecular weight (MW): 655.23.

FT-IR (nujol): 1555 cm$^{-1}$ $\nu_{(C=N)}$.

Example 28

Synthesis of NdCl$_3$(L9)

Sample P1821

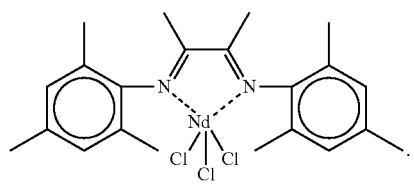

(P1821)

The complex neodymium trichloride/tetrahydrofuran [NdCl$_3$(2THF)] (1.44 g; 3.6 mmoles) was introduced into a 100 ml reaction flask together with 30 ml of tetrahydrofuran (THF). The whole mixture was kept under stirring, for a few minutes, at room temperature, and the ligand having formula (L9) (1.44 g; 4.5 mmoles; molar ratio L9/Nd=1.25) obtained as described in Example 9, dissolved in 30 ml of tetrahydrofuran (THF), was then added. The whole mixture was kept, under stirring, at room temperature, for 4 days. The solvent was then removed under vacuum and the residue obtained was dried under vacuum, at room temperature, obtaining a red solid which was charged onto the porous septum of a heated extractor for solids and was extracted, in continuous, with pentane at boiling point, for 24 hours, in order to remove the non-reacted ligand. The red-coloured residue remaining on the porous septum was recovered and dried under vacuum, at room temperature, obtaining 1.75 g of a solid product corresponding to the complex NdCl$_3$(L9), equal to a conversion of 83% with respect to the neodymium charged.

Elemental analysis [found (calculated)]: C, 45.9% (46.27%); H, 4.7% (4.94%); N, 4.7% (4.91%); Cl, 18.9% (18.62%); Nd, 25.5% (25.26%).

Molecular weight (MW): 571.07.

FT-IR (nujol): 1550 cm$^{-1}$ $\nu_{(C=N)}$.

Example 29

Synthesis of NdCl$_3$(L10)

Sample P1863

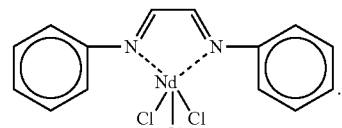

(P1863)

The complex neodymium trichloride/tetrahydrofuran [NdCl$_3$(2THF)] (1.22 g; 3.1 mmoles) was introduced into a 100 ml reaction flask together with 60 ml of tetrahydrofuran (THF). The whole mixture was kept, under stirring, for a few minutes, at room temperature, and the ligand having formula (L10) (0.72 g; 3.4 mmoles; molar ratio L10/Nd=1.1) obtained as described in Example 10, was then added: upon the addition of the ligand, a dark red-coloured suspension was immediately formed. The suspension was kept, under stirring, at room temperature, for 1 day. The solvent was then removed under vacuum and the residue obtained was dried under vacuum, at room temperature, obtaining a red solid which was charged onto the porous septum of a heated extractor for solids and was extracted, in continuous, with pentane at boiling point, for 24 hours, in order to remove the non-reacted ligand. The red-coloured residue remaining on the porous septum was recovered and dried under vacuum, at room temperature, obtaining 1.40 g of a solid product corresponding to the complex NdCl$_3$(L10), equal to a conversion of 98% with respect to the neodymium charged.

Elemental analysis [found (calculated)]: C, 36.5% (36.65%); H, 2.6% (2.64%); N, 6.3% (6.1%); Cl, 23.2% (23.18%); Nd, 31.5% (31.43%).

Molecular weight (MW): 458.86.

FT-IR (nujol): 1550 cm$^{-1}$ $\nu_{(C=N)}$.

Example 30

Synthesis of NdCl$_3$(L11)

Sample P1892

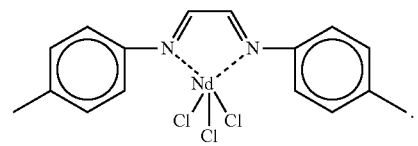

(P1892)

The complex neodymium trichloride/tetrahydrofuran [NdCl$_3$(2THF)] (0.55 g; 1.4 mmoles) was introduced into a 100 ml reaction flask together with 40 ml of tetrahydrofuran (THF). The whole mixture was kept, under stirring, for a few minutes, at room temperature, and the ligand having formula (L11) (0.36 g; 1.54 mmoles; molar ratio L11/Nd=1.1) obtained as described in Example 11, was then added: upon the addition of the ligand, a dark red-coloured solution was immediately formed. The solution was kept, under stirring, at room temperature, for 1 day. The solvent was then reduced in volume under vacuum and the remaining solution was treated with pentane in excess in order to remove the non-reacted ligand, obtaining a precipitate. The precipitate obtained was separated from the solution by means of filtration, obtaining a red solid which was recovered and dried under vacuum, at room temperature, obtaining 0.61 g of a solid product corresponding to the complex $NdCl_3$(L11), equal to a conversion of 89.5% with respect to the neodymium charged.

Elemental analysis [found (calculated)]: C, 39.5% (39.47%); H, 3.2% (3.31%); N, 5.6% (5.75%); Cl, 39.5% (39.47%); Nd, 29.5% (29.62%).

Molecular weight (MW): 458.86.

FT-IR (nujol): 1550 cm$^{-1}$ $v_{(C=N)}$.

Example 31

Synthesis of $NdCl_3$(L12)

Sample P1893

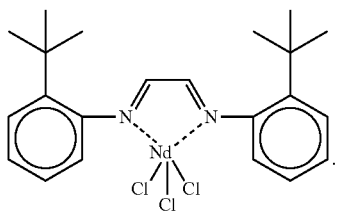
(P1893)

The complex neodymium trichloride/tetrahydrofuran [$NdCl_3$(2THF)] (0.5 g; 1.3 mmoles) was introduced into a 100 ml reaction flask together with 40 ml of tetrahydrofuran (THF). The whole mixture was kept, under stirring, for a few minutes, at room temperature, and the ligand having formula (L12) (0.44 g; 1.4 mmoles; molar ratio L12/Nd=1.1) obtained as described in Example 12, was then added: upon the addition of the ligand, an opalescent yellow-coloured solution was immediately formed. The solution was kept, under stirring, at room temperature, for 1 day obtaining a reddish-coloured solution. The solution was kept, under stirring, at room temperature, for a further 2 days obtaining a red-orange solution. The solvent was then reduced in volume under vacuum and the remaining solution was treated with pentane in excess in order to remove the non-reacted ligand, obtaining a precipitate. The precipitate obtained was separated from the solution by means of filtration, obtaining a red-orange solid which was recovered and dried under vacuum, at room temperature, obtaining 0.71 g of a solid product corresponding to the complex $NdCl_3$(L12), equal to a conversion of 88.8% with respect to the neodymium charged.

Elemental analysis [found (calculated)]: C, 46.4% (46.27%); H, 5% (4.94%); N, 5% (4.91%); Cl, 18.6% (18.62%); Nd, 25.3% (25.26%)

Molecular weight (MW): 571.07.

FT-IR (nujol): 1555 cm$^{-1}$ $v_{(C=N)}$.

Example 32

Synthesis of $NdCl_3$(L13)

Sample P1835

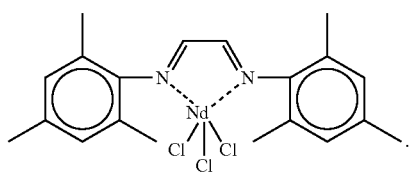
(P1835)

The complex neodymium trichloride/tetrahydrofuran [$NdCl_3$(2THF)] (1.35 g; 3.4 mmoles) was introduced into a 100 ml reaction flask together with 30 ml of tetrahydrofuran (THF). The whole mixture was kept, under stirring, for a few minutes, at room temperature, and the ligand having formula (L13) (1.40 g; 4.8 mmoles; molar ratio L13/Nd=1.4) obtained as described in Example 13, dissolved in 20 ml of tetrahydrofuran (THF), was then added. The whole mixture was kept, under stirring, at room temperature, for 15 days. The solvent was then removed under vacuum and the residue obtained was dried under vacuum, at room temperature, obtaining a red solid which was charged onto the porous septum of a heated extractor for solids and was extracted, in continuous, with pentane at boiling point, for 24 hours, in order to remove the non-reacted ligand. The light brown-coloured residue remaining on the porous septum was recovered and dried under vacuum, at room temperature, obtaining 1.53 g of a solid product corresponding to the complex $NdCl_3$(L13), equal to a conversion of 83% with respect to the neodymium charged.

Elemental analysis [found (calculated)]: C, 43.9% (44.24%); H, 4.3% (4.45%); N, 4.9% (5.16%); Cl, 19.8% (19.59%); Nd, 26.8% (26.56%).

Molecular weight (MW): 543.02.

FT-IR (nujol): 1555 cm$^{-1}$ $v_{(C=N)}$.

Example 33

Synthesis of $NdCl_3$(L14)

Sample GL456

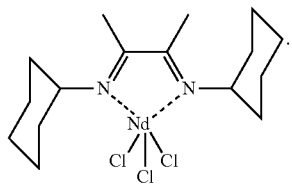
(GL456)

The complex neodymium trichloride/tetrahydrofuran [$NdCl_3$(2THF)] (0.704 g; 1.78 mmoles) was introduced into a 100 ml reaction flask together with 20 ml of tetrahydrofuran (THF). The whole mixture was kept, under stirring, for a few minutes, at room temperature, and the ligand having formula (L14) (0.531 g; 2.1 mmoles; molar ratio L14/Nd=1.2) obtained as described in Example 14, dissolved in 15 ml of tetrahydrofuran (THF), was then added. The whole mixture was kept, under stirring, at room temperature, for 15 days. The solvent was then removed under vacuum and the residue obtained was dried under vacuum, at room temperature, obtaining a light brown solid which was charged onto the porous septum of a heated extractor for solids and was extracted, in continuous, with pentane at boiling point, for 24 hours, in order to remove the non-reacted ligand. The red-coloured residue remaining on the porous septum was recovered and dried under vacuum, at room temperature, obtaining 0.862 g of a solid product corresponding to the complex $NdCl_3(L14)$, equal to a conversion of 97% with respect to the neodymium charged.

Elemental analysis [found (calculated)]: C, 38.6% (38.51%); H, 5.5% (5.66%); N, 5.5% (5.61%); Cl, 21.2% (21.31%); Nd, 28.8% (28.91%).

Molecular weight (MW): 499.01.

FT-IR (nujol): 1550 cm$^{-1}$ $\nu_{(C=N)}$.

Example 34

Synthesis of $NdCl_3(L15)$

Sample P1890

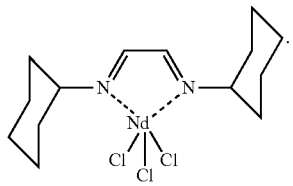
(P1890)

The complex neodymium trichloride/tetrahydrofuran [$NdCl_3(2THF)$] (0.92 g; 2.3 mmoles) was introduced into a 100 ml reaction flask together with 50 ml of tetrahydrofuran (THF). The whole mixture was kept, under stirring, for a few minutes, at room temperature, and the ligand having formula (L15) (0.570 g; 2.6 mmoles; molar ratio L15/Nd=1.1) obtained as described in Example 15, dissolved in 15 ml of tetrahydrofuran (THF), was then added: upon the addition of the ligand, no marked change was observed. The solution was kept, under stirring, at room temperature, for 2 days obtaining a red-coloured solution. The solvent was then reduced in volume under vacuum and the remaining solution was treated with pentane in excess in order to remove the non-reacted ligand, obtaining a precipitate. The precipitate obtained was separated from the solution by means of filtration, obtaining a brownish solid which was recovered and dried under vacuum, at room temperature, obtaining 0.8 g of a solid product corresponding to the complex $NdCl_3$(L15), equal to a conversion of 72.9% with respect to the neodymium charged.

Elemental analysis [found (calculated)]: C, 35.5% (35.7%); H, 4.9% (5.14%); N, 5.7% (5.95%); Cl, 22.7% (22.58%); Nd, 30.8% (30.63%).

Molecular weight (MW): 470.95.

FT-IR (nujol): 1550 cm$^{-1}$ $\nu_{(C=N)}$.

Example 35

Synthesis of $NdCl_3(L16)$

Sample P1916

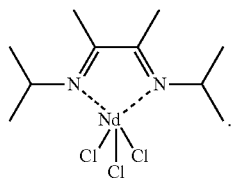
(P1916)

The complex neodymium trichloride/tetrahydrofuran [$NdCl_3(2THF)$] (0.91 g; 2.3 mmoles) was introduced into a 100 ml reaction flask together with 50 ml of tetrahydrofuran (THF). The whole mixture was kept under stirring, for a few minutes, at room temperature, and the ligand having formula (L16) (0.35 g; 2.5 mmoles; molar ratio L16/Nd=1.1) obtained as described in Example 16, was then added: upon the addition of the ligand, a completely homogeneous solution was formed which, in a few minutes, was transformed into a light brown-coloured suspension. The suspension was kept, under stirring, at room temperature, for 2 days. The suspension was then filtered, obtaining a beige solid residue which was recovered and dried under vacuum, at room temperature, obtaining 0.851 g of a solid product corresponding to the complex $NdCl_3$(L16), equal to a conversion of 90.7% with respect to the neodymium charged.

Elemental analysis [found (calculated)]: C, 24.5% (24.59%); H, 4% (4.13%); N, 7.1% (7.17%); Cl, 27% (27.21%); Nd, 36.8% (36.91%).

Molecular weight (MW): 390.82.

FT-IR (nujol): 1555 cm$^{-1}$ $\nu_{(C=N)}$.

Example 36

Synthesis of $LaCl_3(L14)$

Sample GL605

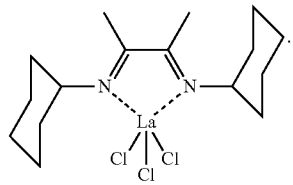
(GL605)

Lanthanum trichloride ($LaCl_3$) (0.435 g; 1.77 mmoles) was introduced into a 100 ml reaction flask together with 20 ml of tetrahydrofuran (THF). The whole mixture was kept, under stirring, for a few minutes, at room temperature, and the ligand having formula (L14) (0.438 g; 1.76 mmoles;

molar ratio L14/La=1) obtained as described in Example 14, was then added. The whole mixture was kept, under stirring, at room temperature, for 12 days. The solvent was then removed under vacuum and the residue obtained was dried under vacuum, at room temperature, obtaining a white solid which was charged onto the porous septum of a heated extractor for solids and was extracted, in continuous, with pentane at boiling point, for 24 hours, in order to remove the non-reacted ligand. The red-coloured residue remaining on the porous septum was recovered and dried under vacuum, at room temperature, obtaining 0.386 g of a solid product corresponding to the complex $LaCl_3(L14)$, equal to a conversion of 88.9% with respect to the lanthanum charged.

Elemental analysis [found (calculated)]: C, 38.8% (38.93%); H, 5.65% (5.72%); N, 5.7% (5.67%); Cl, 21.6% (21.54%); La, 28.1% (28.14%).

Molecular weight (MW): 493.67.

FT-IR (nujol): 1555 cm$^{-1}$ $v_{(C=N)}$.

Example 37

Synthesis of $LaCl_3(L11)$

Sample P1897

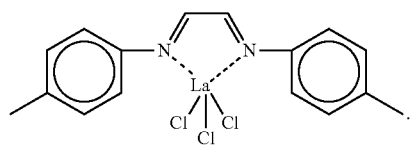

(P1897)

Lanthanum trichloride ($LaCl_3$) (0.45 g; 1.8 mmoles) was introduced into a 100 ml reaction flask together with 50 ml of tetrahydrofuran (THF). The whole mixture was kept, under stirring, for a few minutes, at room temperature, and the ligand having formula (L11) (0.48 g; 2 mmoles; molar ratio L11/La=1.1) obtained as described in Example 11, was then added. The whole mixture was kept, under stirring, at room temperature, for 3 days, obtaining a bright red-coloured suspension. The solution was left to decant obtaining a bright red-coloured solid precipitate. The volume of the solvent was then reduced under vacuum, at room temperature. The remaining solution was treated with pentane in excess obtaining a brown-red-coloured solid precipitate which was recovered and dried under vacuum, at room temperature, obtaining 0.71 g of a solid product corresponding to the complex $LaCl_3(L11)$, equal to a conversion of 81.8% with respect to the lanthanum charged.

Elemental analysis [found (calculated)]: C, 39.8% (39.91%); H, 3.4% (3.35%); N, 5.8% (5.82%); Cl, 22.2% (22.09%); La, 28.8% (28.84%).

Molecular weight (MW): 481.58.

FT-IR (nujol): 1550 cm$^{-1}$ $v_{(C=N)}$.

Example 38

Synthesis of $PrCl_3(L15)$

Sample GL610

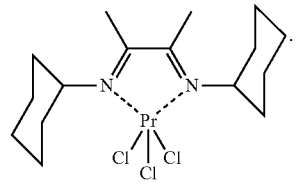

(GL610)

Praseodymium trichloride ($PrCl_3$) (0.676 g; 1.73 mmoles) was introduced into a 100 ml reaction flask together with 30 ml of tetrahydrofuran (THF). The whole mixture was kept, under stirring, for a few minutes, at room temperature, and the ligand having formula (L15) (0.418 g; 1.9 mmoles; molar ratio L15/Pr=1.1) obtained as described in Example 15, was then added. The whole mixture was kept, under stirring, at room temperature, for 12 days. The solvent was then removed under vacuum and the residue obtained was dried under vacuum, at room temperature, obtaining a light brown solid which was charged onto the porous septum of a heated extractor for solids and was extracted, in continuous, with pentane at boiling point, for 24 hours, in order to remove the non-reacted ligand. The red-coloured residue remaining on the porous septum was recovered and dried under vacuum, at room temperature, obtaining 0.625 g of a solid product corresponding to the complex $PrCl_3(L15)$, equal to a conversion of 77.3% with respect to the praseodymium charged.

Elemental analysis [found (calculated)]: C, 36.1% (35.96%); H, 5.3% (5.17%); N, 6.1% (5.99%); Cl, 22.5% (22.74%); Pr, 30.3% (30.13%).

Molecular weight (MW): 467.62.

FT-IR (nujol): 1555 cm$^{-1}$ $v_{(C=N)}$.

Example 39

Synthesis of $PrCl_3(L12)$

Sample P1901

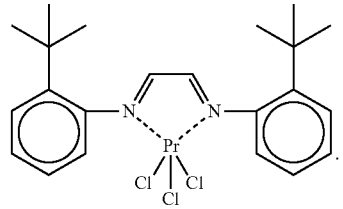

(P1901)

Praseodymium trichloride ($PrCl_3$) (0.33 g; 1.35 mmoles) was introduced into a 100 ml reaction flask together with 50 ml of tetrahydrofuran (THF). The whole mixture was kept, under stirring, for a few minutes, at room temperature, and the ligand having formula (L12) (0.5 g; 1.6 mmoles; molar ratio L12/Pr=1.1) obtained as described in Example 12, was then added. The whole mixture was kept, under stirring, at room temperature, for 15 days. The volume of the solvent was then reduced under vacuum, at room temperature. The remaining solution was treated with pentane in excess obtaining a brown-red-coloured solid precipitate which was recovered and dried under vacuum, at room temperature, obtaining 0.68 g of a solid product corresponding to the complex PrCl$_3$(L12), equal to a conversion of 88.7% with respect to the praseodymium charged.

Elemental analysis [found (calculated)]: C, 46.7% (46.57%); H, 5% (4.97%); N, 5% (4.93%); Cl, 18.9% (18.73%); Pr, 24.9% (24.82%).

Molecular weight (MW): 567.74.

FT-IR (nujol): 1555 cm$^{-1}$ $\nu_{(C=N)}$.

Example 40

Synthesis of NdCl$_3$(L17)

Sample P1828

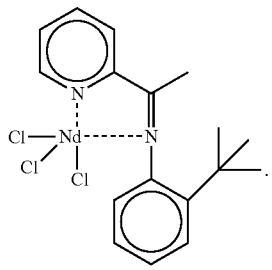

(P1828)

The complex neodymium trichloride/tetrahydrofuran [NdCl$_3$(2THF)] (1.4 g; 3.5 mmoles) was introduced into a 100 ml reaction flask together with 40 ml of tetrahydrofuran (THF). The whole mixture was kept, under stirring, for a few minutes, at room temperature, and the ligand having formula (L17) (1 g; 4 mmoles; molar ratio L17/Nd=1.15) obtained as described in Example 17, was then added. The whole mixture was kept, under stirring, at room temperature, for 4 days, obtaining a relatively homogeneous greenish-coloured solution. The solvent was then reduced in volume under vacuum and the remaining solution was treated with pentane in excess. The precipitate obtained was separated from the solution by means of filtration, obtaining a yellow/green solid which was washed with pentane in order to remove the non-reacted ligand and dried under vacuum, at room temperature, obtaining 1.59 g of a solid product corresponding to the complex NdCl$_3$(L17), equal to a conversion of 88% with respect to the neodymium charged.

Elemental analysis [found (calculated)]: C, 42.1% (41.74%); H, 4.7% (4.48%); N, 5.2% (5.41%); Cl, 20.3% (20.53%); Nd, 27.5% (27.85%).

Molecular weight (MW): 517.99.

Example 41

Synthesis of NdCl$_3$(L18)

Sample P1834

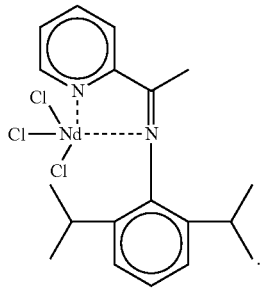

(P1834)

The complex neodymium trichloride/tetrahydrofuran [NdCl$_3$(2THF)] (1.23 g; 3.1 mmoles) was introduced into a 100 ml reaction flask together with 40 ml of tetrahydrofuran (THF). The whole mixture was kept under stirring, for a few minutes, at room temperature, and the ligand having formula (L18) (1.034 g; 344 mmoles; molar ratio L22/Nd=1.11) obtained as described in Example 18, was then added. The whole mixture was kept, under stirring at room temperature for 4 days, obtaining a relatively homogeneous greenish-coloured solution. The solvent was then reduced in volume under vacuum and the remaining solution was treated with pentane in excess. The precipitate obtained was separated from the solution by means of filtration, obtaining a yellow/green solid which was washed with pentane in order to remove the non-reacted ligand and dried under vacuum, at room temperature, obtaining 1.4 g of a solid product corresponding to the complex NdCl$_3$(L18), equal to a conversion of 85% with respect to the neodymium charged.

Elemental analysis [found (calculated)]: C, 43.1% (42.98%); H, 4.8% (4.56%); N, 5.1% (5.28%); Cl, 19.8% (20.03%); Nd, 26.8% (27.16%)

Molecular weight (MW): 531.01.

Example 42

P1878

2 ml of 1,3-butadiene, equal to about 1.4 g, were condensed, at a low temperature (−20° C.), in a 25 ml test-tube. 7.35 ml of heptane were then added and the temperature of the solution thus obtained was brought to 20° C. Tetra-iso-butyl-aluminoxane (TIBAO) in a cyclohexane solution (6.2 ml; 1×10$^{-2}$ moles, equal to about 2.9 g) was then added and subsequently the complex NdCl$_3$(L1) [sample P1864] (2.45 ml of a toluene solution at a concentration equal to 2 mg/ml; 1×10$^{-5}$ moles, equal to about 4.9 mg) obtained as described in Example 17. The whole mixture was kept, under magnetic stirring, at 20° C., for 3 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.643 g of polybutadiene having a content of 1,4-cis units >99%: further characteristics of the process and of the polybutadiene obtained are indicated in Table 1.

Example 43

GL446

2 ml of 1,3-butadiene, equal to about 1.4 g, were condensed, at a low temperature (−20° C.), in a 25 ml test-tube. 7.1 ml of toluene were then added and the temperature of the solution thus obtained was brought to 20° C. Methylaluminoxane (MAO) in a toluene solution (6.3 ml; $1 \times 10^{-2}$ moles, equal to about 0.58 g) was then added and subsequently the complex $NdCl_3(L2)$ [sample GL457] (2.6 ml of a toluene solution at a concentration equal to 2 mg/ml; $1 \times 10^{-5}$ moles, equal to about 5.15 mg) obtained as described in Example 18. The whole mixture was kept, under magnetic stirring, at 20° C., for 456 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.29 g of polybutadiene having a content of 1,4-cis units >99%: further characteristics of the process and of the polybutadiene obtained are indicated in Table 1.

Example 44

GL483

2 ml of 1,3-butadiene, equal to about 1.4 g, were condensed, at a low temperature (−20° C.), in a 25 ml test-tube. 13.15 ml of heptane were then added and the temperature of the solution thus obtained was brought to 20° C. Tri-iso-butyl-aluminium (TIBA) (0.25 ml; $1 \times 10^{-3}$ moles, equal to about 0.198 g) was then added and subsequently the complex $NdCl_3(L2)$ [sample GL457] (2.6 ml of a toluene solution at a concentration equal to 2 mg/ml; $1 \times 10^{-5}$ moles, equal to about 5.15 mg) obtained as described in Example 18. The whole mixture was kept, under magnetic stirring, at 20° C., for 5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.125 g of polybutadiene having a content of 1,4-cis units >99%: further characteristics of the process and of the polybutadiene obtained are indicated in Table 1.

Example 45

GL490

2 ml of 1,3-butadiene, equal to about 1.4 g, were condensed, at a low temperature (−20° C.), in a 25 ml test-tube. 7.2 ml of toluene were then added and the temperature of the solution thus obtained was brought to 20° C. Tetra-iso-butyl-aluminoxane (TIBAO) in a cyclohexane solution (6.2 ml; $1 \times 10^{-2}$ moles, equal to about 2.9 g) was then added, and subsequently the complex $NdCl_3(L2)$ [sample GL457] (2.6 ml of a toluene solution at a concentration equal to 2 mg/ml; $1 \times 10^{-5}$ moles, equal to about 5.15 mg) obtained as described in Example 18. The whole mixture was kept, under magnetic stirring, at 20° C., for 5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.449 g of polybutadiene having a content of 1,4-cis units >99%: further characteristics of the process and of the polybutadiene obtained are indicated in Table 1.

Example 46

GL488

2 ml of 1,3-butadiene, equal to about 1.4 g, were condensed, at a low temperature (−20° C.), in a 25 ml test-tube. 7.2 ml of toluene were then added and the temperature of the solution thus obtained was brought to 20° C. Tetra-iso-butyl-aluminoxane (TIBAO) in a cyclohexane solution (6.2 ml; $1 \times 10^{-2}$ moles, equal to about 2.9 g) was then added, and subsequently the complex $NdCl_3(L3)$ [sample GL455] (2.6 ml of a toluene solution at a concentration equal to 2 mg/ml; $1 \times 10^{-5}$ moles, equal to about 5.15 mg) obtained as described in Example 19. The whole mixture was kept, under magnetic stirring, at 20° C., for 5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.19 g of polybutadiene having a content of 1,4-cis units >99%: further characteristics of the process and of the polybutadiene obtained are indicated in Table 1.

Figure 2:
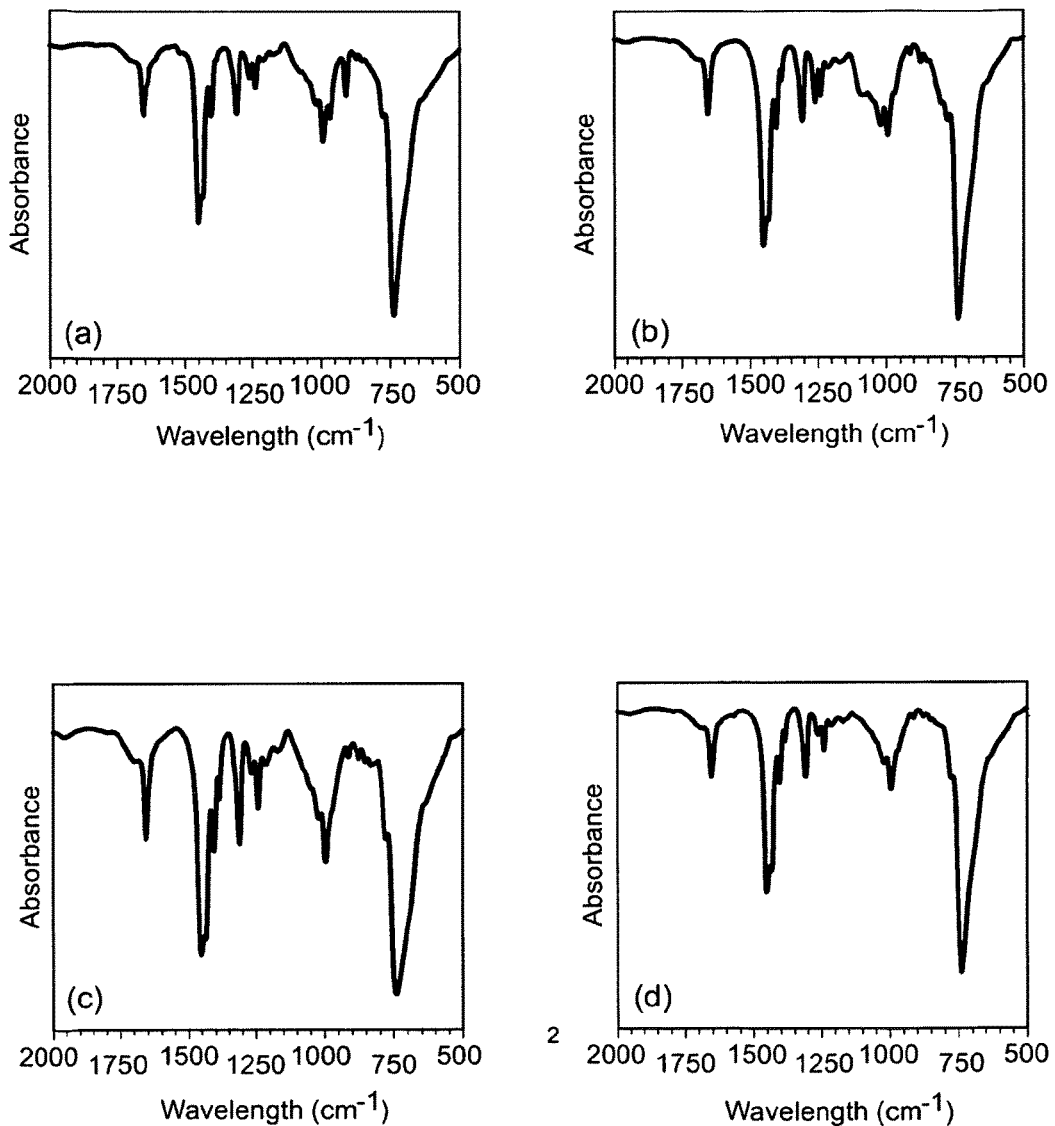

FIG. 2(b) shows the FT-IR spectrum of the polybutadiene obtained.

Example 47

GL561

2 ml of 1,3-butadiene, equal to about 1.4 g, were condensed, at a low temperature (−20° C.), in a 25 ml test-tube. 7.25 ml of toluene were then added and the temperature of the solution thus obtained was brought to 20° C. Methylaluminoxane (MAO) in a toluene solution (6.3 ml; $1 \times 10^{-2}$ moles, equal to about 0.58 g) was then added, and subsequently the complex $NdCl_3(L3)$ [sample GL455] (2.6 ml of a toluene solution at a concentration equal to 2 mg/ml; $1 \times 10^{-5}$ moles, equal to about 5.15 mg) obtained as described in Example 19. The whole mixture was kept, under magnetic stirring, at 20° C., for 288 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.505 g of polybutadiene having a content of 1,4-cis units >99%: further characteristics of the process and of the polybutadiene obtained are indicated in Table 1.

Example 48

P1950

2 ml of 1,3-butadiene, equal to about 1.4 g, were condensed, at a low temperature (−20° C.), in a 25 ml test-tube. 13.2 ml of toluene were then added and the temperature of the solution thus obtained was brought to 20° C. Di-iso-butyl-aluminium hydride (DIBAH) (0.18 ml; 1 mmole, equal to about 144 mg) was then added, and subsequently the complex $NdCl_3(L3)$ [sample GL455] (2.6 ml of a toluene solution at a concentration equal to 2 mg/ml; $1 \times 10^{-5}$ moles, equal to about 5.15 mg) obtained as described in Example 19. The whole mixture was kept, under magnetic stirring, at 20° C., for 6.33 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.535 g of polybutadiene having a content of 1,4-cis units >99%: further characteristics of the process and of the polybutadiene obtained are indicated in Table 1.

Example 49

GL495

2 ml of 1,3-butadiene, equal to about 1.4 g, were condensed, at a low temperature (−20° C.), in a 25 ml test-tube. 7.2 ml of heptane were then added and the temperature of the solution thus obtained was brought to 20° C. Tetra-iso-butyl-aluminoxane (TIBAO) in a cyclohexane solution (6.2 ml; $1 \times 10^{-2}$ moles, equal to about 2.9 g) was then added, and subsequently the complex $NdCl_3(L4)$ [sample P1822] (2.6 ml of a toluene solution at a concentration equal to 2 mg/ml; $1 \times 10^{-5}$ moles, equal to about 5.15 mg) obtained as described in Example 20. The whole mixture was kept, under magnetic stirring, at 20° C., for 96 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.4 g of polybutadiene having a content of 1,4-cis units >99%: further characteristics of the process and of the polybutadiene obtained are indicated in Table 1.

FIG. 2(c) shows the FT-IR spectrum of the polybutadiene obtained.

Example 50

GL593

2 ml of 1,3-butadiene, equal to about 1.4 g, were condensed, at a low temperature (−20° C.), in a 25 ml test-tube. 7.1 ml of heptane were then added and the temperature of the solution thus obtained was brought to 20° C. Tetra-iso-butyl-aluminoxane (TIBAO) in a cyclohexane solution (6.2 ml; $1 \times 10^{-2}$ moles, equal to about 2.9 g) was then added, and subsequently the complex $NdCl_3(L6)$ [sample P1820] (2.7 ml of a toluene solution at a concentration equal to 2 mg/ml; $1 \times 10^{-5}$ moles, equal to about 5.4 mg) obtained as described in Example 22. The whole mixture was kept, under magnetic stirring, at 20° C., for 4 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.249 g of polybutadiene having a content of 1,4-cis units >99%: further characteristics of the process and polybutadiene obtained are indicated in Table 1.

Example 51

GL514

2 ml of 1,3-butadiene, equal to about 1.4 g, were condensed, at a low temperature (−20° C.), in a 25 ml test-tube. 6.95 ml of heptane were then added and the temperature of the solution thus obtained was brought to 20° C. Tetra-iso-butyl-aluminoxane (TIBAO) in a cyclohexane solution (6.2 ml; $1 \times 10^{-2}$ moles, equal to about 2.9 g) was then added, and subsequently the complex $NdCl_3(L9)$ [sample P1821] (2.85 ml of a toluene solution at a concentration equal to 2 mg/ml; $1 \times 10^{-5}$ moles, equal to about 5.7 mg) obtained as described in Example 28. The whole mixture was kept, under magnetic stirring, at 20° C., for 6.5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.469 g of polybutadiene having a content of 1,4-cis units >99%: further characteristics of the process and of the polybutadiene obtained are indicated in Table 1.

Example 52

GL550

2 ml of 1,3-butadiene, equal to about 1.4 g, were condensed, at a low temperature (−20° C.), in a 25 ml test-tube. 7.5 ml of heptane were then added and the temperature of the solution thus obtained was brought to 20° C. Tetra-iso-butyl-aluminoxane (TIBAO) in a cyclohexane solution (6.2 ml; $1 \times 10^{-2}$ moles, equal to about 2.9 g) was then added, and subsequently the complex $NdCl_3(L10)$ [sample P1863] (2.3 ml of a toluene solution at a concentration equal to 2 mg/ml; $1 \times 10^{-5}$ moles, equal to about 4.6 mg) obtained as described in Example 26. The whole mixture was kept, under magnetic stirring, at 20° C., for 4 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.771 g of polybutadiene having a content of 1,4-cis units >99%: further characteristics of the process and of the polybutadiene obtained are indicated in Table 1.

Example 53

GL551

2 ml of 1,3-butadiene, equal to about 1.4 g, were condensed, at a low temperature (−20° C.), in a 25 ml test-tube. 7.4 ml of toluene were then added and the temperature of the solution thus obtained was brought to 20° C. Methylaluminoxane (MAO) in a toluene solution (6.3 ml; $1 \times 10^{-2}$ moles, equal to about 0.58 g) was then added, and subsequently the complex $NdCl_3(L10)$ [sample P1863] (2.3 ml of a toluene solution at a concentration equal to 2 mg/ml; $1 \times 10^{-5}$ moles, equal to about 4.6 mg) obtained as described in Example 26. The whole mixture was kept, under magnetic stirring, at 20° C., for 96 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.08 g of polybutadiene having a content of 1,4-cis units >99%: further characteristics of the process and of the polybutadiene obtained are indicated in Table 1.

Example 54

GL632

2 ml of 1,3-butadiene, equal to about 1.4 g, were condensed, at a low temperature (−20° C.), in a 25 ml test-tube.

47

7.25 ml of heptane were then added and the temperature of the solution thus obtained was brought to 20° C. Tetra-iso-butyl-aluminoxane (TIBAO) in a cyclohexane solution (6.2 ml; $1\times10^{-2}$ moles, equal to about 2.9 g) was then added, and subsequently the complex NdCl$_3$(L11) [sample P1892] (2.3 ml of a toluene solution at a concentration equal to 2 mg/ml; $1\times10^{-5}$ moles, equal to about 4.6 mg) obtained as described in Example 27. The whole mixture was kept, under magnetic stirring, at 20° C., for 3 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.057 g of polybutadiene having a content of 1,4-cis units >99%: further characteristics of the process and of the polybutadiene obtained are indicated in Table 1.

Example 55

GL612

2 ml of 1,3-butadiene, equal to about 1.4 g, were condensed, at a low temperature (−20° C.), in a 25 ml test-tube. 7.4 ml of toluene were then added and the temperature of the solution thus obtained was brought to 20° C. Methylaluminoxane (MAO) in a toluene solution (6.3 ml; $1\times10^{-2}$ moles, equal to about 0.58 g) was then added, and subsequently the complex NdCl$_3$(L11) [sample P1892] (2.3 ml of a toluene solution at a concentration equal to 2 mg/ml; $1\times10^{-5}$ moles, equal to about 4.6 mg) obtained as described in Example 27. The whole mixture was kept, under magnetic stirring, at 20° C., for 170 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.008 g of polybutadiene having a content of 1,4-cis units >99%: further characteristics of the process and of the polybutadiene obtained are indicated in Table 1.

Example 56

P1949

2 ml of 1,3-butadiene, equal to about 1.4 g, were condensed, at a low temperature (−20° C.), in a 25 ml test-tube. 13.5 ml of heptane were then added and the temperature of the solution thus obtained was brought to 20° C. Di-iso-butyl-aluminium hydride (DIBAH) (0.18 ml; 1 mmole, equal to about 0.144 g) was then added, and subsequently the complex NdCl$_3$(L11) [sample P1892] (2.3 ml of a toluene solution at a concentration equal to 2 mg/ml; $1\times10^{-5}$ moles, equal to about 4.6 mg) obtained as described in Example 27. The whole mixture was kept, under magnetic stirring, at 20° C., for 6.75 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.462 g of polybutadiene having a content of 1,4-cis units >99%: further characteristics of the process and of the polybutadiene obtained are indicated in Table 1.

FIG. 2(d) shows the FT-IR spectrum of the polybutadiene obtained.

48

Example 57

P1921

2 ml of 1,3-butadiene, equal to about 1.4 g, were condensed, at a low temperature (−20° C.), in a 25 ml test-tube. 6.95 ml of toluene were then added and the temperature of the solution thus obtained was brought to 20° C. Tetra-iso-butyl-aluminoxane (TIBAO) in a cyclohexane solution (6.2 ml; $1\times10^{-2}$ moles, equal to about 2.9 g) was then added, and subsequently the complex NdCl$_3$(L12) [sample P1893] (2.85 ml of a toluene solution at a concentration equal to 2 mg/ml; $1\times10^{-5}$ moles, equal to about 5.7 mg) obtained as described in Example 28. The whole mixture was kept, under magnetic stirring, at 20° C., for 1.5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.009 g of polybutadiene having a content of 1,4-cis units >99%: further characteristics of the process and of the polybutadiene obtained are indicated in Table 1.

Figure 3:
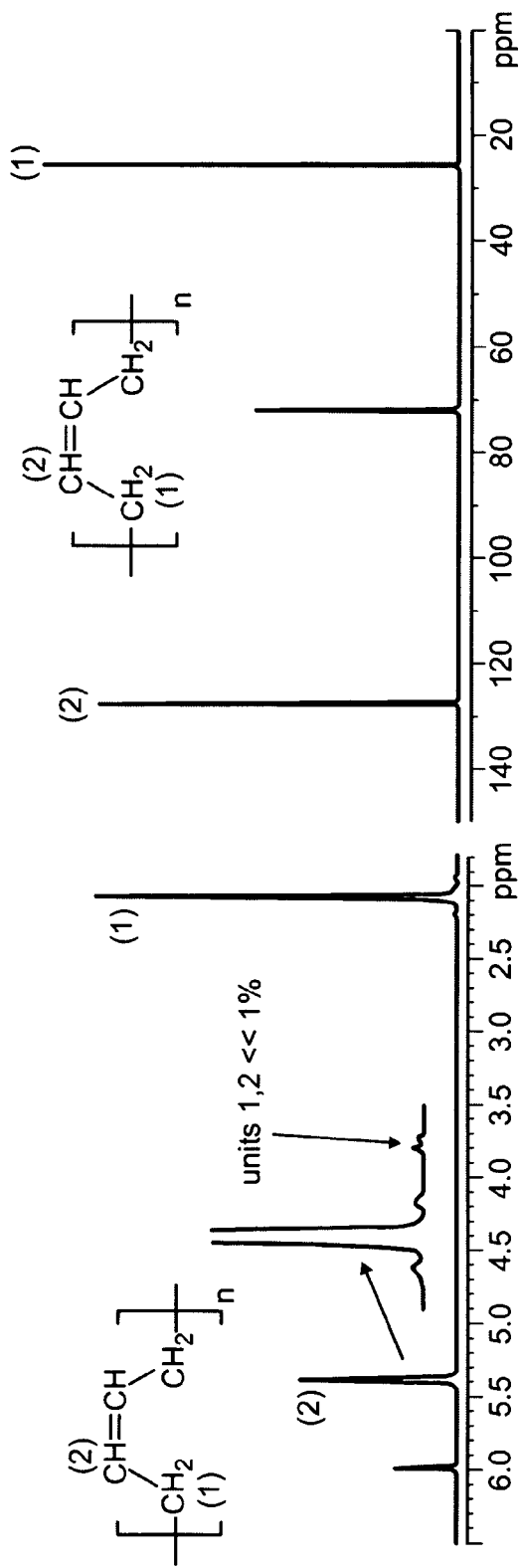
FIG. 3 illustrates $^1$H-NMR spectra (on the left) and $^{13}$C-NMR (on the right) of polybutadiene (C$_2$D$_2$Cl$_4$ as deuterated solvent, HMDS as internal standard, 103° C.) obtained with NdCl3(L12)/TIBAO (Table 1, Example 57).

FIG. 3 shows the $^1$H-NMR and $^{13}$C-NMR spectra of the polybutadiene obtained.

Example 58

P1951

2 ml of 1,3-butadiene, equal to about 1.4 g, were condensed, at a low temperature (−20° C.), in a 25 ml test-tube. 12.3 ml of heptane were then added and the temperature of the solution thus obtained was brought to 20° C. Di-iso-butyl-aluminium hydride (DIBAH) (0.18 ml; 1 mmole, equal to about 0.144 g) was then added, and subsequently the complex NdCl$_3$(L12) [sample P1893] (2.85 ml of a toluene solution at a concentration equal to 2 mg/ml; $1\times10^{-5}$ moles, equal to about 5.7 mg) obtained as described in Example 28. The whole mixture was kept, under magnetic stirring, at 20° C., for 5.3 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.644 g of polybutadiene having a content of 1,4-cis units >99%: further characteristics of the process and of the polybutadiene obtained are indicated in Table 1.

Example 59

GL558

2 ml of 1,3-butadiene, equal to about 1.4 g, were condensed, at a low temperature (−20° C.), in a 25 ml test-tube. 7.3 ml of heptane were then added and the temperature of the solution thus obtained was brought to 20° C. Tetra-iso-butyl-aluminoxane (TIBAO) in a cyclohexane solution (6.2 ml; $1\times10^{-2}$ moles, equal to about 2.9 g) was then added, and subsequently the complex NdCl$_3$(L14) [sample GL456] (2.5 ml of a toluene solution at a concentration equal to 2 mg/ml; $1\times10^{-5}$ moles, equal to about 5 mg) obtained as described in Example 30. The whole mixture was kept, under magnetic stirring, at 20° C., for 5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.085 g of polybutadiene having a content of 1,4-cis units >99%: further characteristics of the process and of the polybutadiene obtained are indicated in Table 1.

Example 60

GL560

2 ml of 1,3-butadiene, equal to about 1.4 g, were condensed, at a low temperature (−20° C.), in a 25 ml test-tube. 7.2 ml of toluene were then added and the temperature of the solution thus obtained was brought to 20° C. Methylaluminoxane (MAO) in a toluene solution (6.3 ml; $1 \times 10^{-2}$ moles, equal to about 0.58 g) was then added, and subsequently the complex $NdCl_3(L14)$ [sample GL456] (2.5 ml of a toluene solution at a concentration equal to 2 mg/ml; $1 \times 10^{-5}$ moles, equal to about 5 mg) obtained as described in Example 30. The whole mixture was kept, under magnetic stirring, at 20° C., for 288 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.787 g of polybutadiene having a content of 1,4-cis units >99%: further characteristics of the process and polybutadiene obtained are indicated in Table 1.

Example 61

GL594

2 ml of 1,3-butadiene, equal to about 1.4 g, were condensed, at a low temperature (−20° C.), in a 25 ml test-tube. 7.45 ml of heptane were then added and the temperature of the solution thus obtained was brought to 20° C. Tetra-iso-butyl-aluminoxane (TIBAO) in a cyclohexane solution (6.2 ml; $1 \times 10^{-2}$ moles, equal to about 2.9 g) was then added, and subsequently the complex $NdCl_3(L15)$ [sample P1890] (2.35 ml of a toluene solution at a concentration equal to 2 mg/ml; $1 \times 10^{-5}$ moles, equal to about 4.7 mg) obtained as described in Example 31. The whole mixture was kept, under magnetic stirring, at 20° C., for 7.5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.462 g of polybutadiene having a content of 1,4-cis units >99%: further characteristics of the process and of the polybutadiene obtained are indicated in Table 1.

Example 62

P1923

2 ml of 1,3-butadiene, equal to about 1.4 g, were condensed, at a low temperature (−20° C.), in a 25 ml test-tube. 7.85 ml of heptane were then added and the temperature of the solution thus obtained was brought to 20° C. Tetra-iso-butyl-aluminoxane (TIBAO) in a cyclohexane solution (6.2 ml; $1 \times 10^{-2}$ moles, equal to about 2.9 g) was then added, and subsequently the complex $NdCl_3(L16)$ [sample P1916] (1.95 ml of a toluene solution at a concentration equal to 2 mg/ml; $1 \times 10^{-5}$ moles, equal to about 3.9 mg) obtained as described in Example 32. The whole mixture was kept, under magnetic stirring, at 20° C., for 5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.253 g of polybutadiene having a content of 1,4-cis units >99%: further characteristics of the process and of the polybutadiene obtained are indicated in Table 1.

Example 63

P1931

2 ml of 1,3-butadiene, equal to about 1.4 g, were condensed, at a low temperature (−20° C.), in a 25 ml test-tube. 7.4 ml of heptane were then added and the temperature of the solution thus obtained was brought to 20° C. Tetra-iso-butyl-aluminoxane (TIBAO) in a cyclohexane solution (6.2 ml; $1 \times 10^{-2}$ moles, equal to about 2.9 g) was then added, and subsequently the complex $LaCl_3(L11)$ [sample P1897] (2.4 ml of a toluene solution at a concentration equal to 2 mg/ml; $1 \times 10^{-5}$ moles, equal to about 4.8 mg) obtained as described in Example 34. The whole mixture was kept, under magnetic stirring, at 20° C., for 18 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.398 g of polybutadiene having a content of 1,4-cis units >99%: further characteristics of the process and of the polybutadiene obtained are indicated in Table 1.

Example 64

P1932

2 ml of 1,3-butadiene, equal to about 1.4 g, were condensed, at a low temperature (−20° C.), in a 25 ml test-tube. 7.45 ml of heptane were then added and the temperature of the solution thus obtained was brought to 20° C. Tetra-iso-butyl-aluminoxane (TIBAO) in a cyclohexane solution (6.2 ml; $1 \times 10^{-2}$ moles, equal to about 2.9 g) was then added, and subsequently the complex $PrCl_3(L15)$ [sample GL610] (2.35 ml of a toluene solution at a concentration equal to 2 mg/ml; $1 \times 10^{-5}$ moles, equal to about 4.7 mg) obtained as described in Example 35. The whole mixture was kept, under magnetic stirring, at 20° C., for 3 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.368 g of polybutadiene having a content of 1,4-cis units >99%: further characteristics of the process and of the polybutadiene obtained are indicated in Table 1.

Example 65

P1947

2 ml of 1,3-butadiene, equal to about 1.4 g, were condensed, at a low temperature (−20° C.), in a 25 ml test-tube. 13.5 ml of heptane were then added and the temperature of the solution thus obtained was brought to 20° C. Di-isobutyl-aluminium hydride (DIBAH) (0.18 ml; 1 mmole, equal to about 0.144 g) was then added, and subsequently the complex $PrCl_3(L15)$ [sample GL610] (2.35 ml of a toluene solution at a concentration equal to 2 mg/ml; $1\times10^{-5}$ moles, equal to about 4.7 mg) obtained as described in Example 35. The whole mixture was kept, under magnetic stirring, at 20° C., for 5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.312 g of polybutadiene having a content of 1,4-cis units >99%: further characteristics of the process and of the polybutadiene obtained are indicated in Table 1.

Example 66

P1933

2 ml of 1,3-butadiene, equal to about 1.4 g, were condensed, at a low temperature (−20° C.), in a 25 ml test-tube. 6.95 ml of heptane were then added and the temperature of the solution thus obtained was brought to 20° C. Tetra-iso-butyl-aluminoxane (TIBAO) in a cyclohexane solution (6.2 ml; $1\times10^{-2}$ moles, equal to about 2.9 g) was then added, and subsequently the complex $PrCl_3(L12)$ [sample P1901] (2.85 ml of a toluene solution at a concentration equal to 2 mg/ml; $1\times10^{-5}$ moles, equal to about 5.7 mg) obtained as described in Example 36. The whole mixture was kept, under magnetic stirring, at 20° C., for 20 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.244 g of polybutadiene having a content of 1,4-cis units >99%: further characteristics of the process and of the polybutadiene obtained are indicated in Table 1.

Example 67

A009

2 ml of 1,3-butadiene, equal to about 1.4 g, were condensed, at a low temperature (−20° C.), in a 25 ml test-tube. 7.2 ml of heptane were then added and the temperature of the solution thus obtained was brought to 20° C. Tetra-iso-butyl-aluminoxane (TIBAO) in a cyclohexane solution (6.2 ml; $1\times10^{-2}$ moles, equal to about 2.9 g) was then added, and subsequently the complex $NdCl_3(L17)$ [sample P1828] (2.6 ml of a toluene solution at a concentration equal to 2 mg/ml; $1\times10^{-5}$ moles, equal to about 5.2 mg) obtained as described in Example 40. The whole mixture was kept, under magnetic stirring, at 20° C., for 3 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.738 g of polybutadiene having a content of 1,4-cis units >99%: further characteristics of the process and of the polybutadiene obtained are indicated in Table 1.

Example 68

A010

2 ml of 1,3-butadiene, equal to about 1.4 g, were condensed, at a low temperature (−20° C.), in a 25 ml test-tube. 13.22 ml of heptane were then added and the temperature of the solution thus obtained was brought to 20° C. Di-iso-butyl-aluminium hydride (DIBAH) (0.18 ml; 1 mmole, equal to about 144 g) was then added, and subsequently the complex $NdCl_3(L17)$ [sample P1828] (2.6 ml of a toluene solution at a concentration equal to 2 mg/ml; $1\times10^{-5}$ moles, equal to about 5.2 mg) obtained as described in Example 40. The whole mixture was kept, under magnetic stirring, at 20° C., for 6 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.657 g of polybutadiene having a content of 1,4-cis units >99%: further characteristics of the process and of the polybutadiene obtained are indicated in Table 1.

TABLE 1

Polymerization of 1,3 butadiene with catalytic systems prepared in situ

| Example | Al/Ln (molar ratio) | Conver. (%) | $N^{(a)}$ ($h^{-1}$) | $T_m^{(b)}$ (° C.) | $T_c^{(c)}$ (° C.) | $M_w \times 10^{-3}$ (g × $mol^{-1}$) | $M_w/M_n$ | $\alpha^{(d)}$ |
|---|---|---|---|---|---|---|---|---|
| 42 | 1000 | 45.9 | 397 | −3.7 | −24.3 | 1070 | 6 | 0.60 |
| 43 | 1000 | 92.1 | 5 | −2.9 | −23.1 | 172 | 4.5 | 0.62 |
| 44 | 100 | 8.9 | 2 | −3.2 | −24.7 | 2100 | 5.8 | 0.62 |
| 45 | 1000 | 32.1 | 167 | −2.3 | −20.8 | 1600 | 7.4 | 0.62 |
| 46 | 1000 | 85 | 441 | −2.9 | −22.5 | 1700 | 11 | 0.64 |
| 47 | 1000 | 36.1 | 3 | −3.4 | −25.7 | 150 | 6.6 | 0.62 |
| 48 | 100 | 38.2 | 357 | −2.1 | −20.3 | 1650 | 8.2 | 0.63 |
| 49 | 1000 | 99.8 | 647 | −2.3 | −20.7 | 1200 | 6.0 | 0.60 |
| 50 | 1000 | 17.8 | 49 | −2.8 | −20.6 | 1500 | 7.1 | 0.61 |
| 51 | 1000 | 33.5 | 134 | −4.0 | −22.7 | 1340 | 6.5 | 0.63 |
| 52 | 1000 | 55.1 | 357 | −2.9 | −21.8 | 1650 | 8.2 | 0.62 |
| 53 | 1000 | 5.6 | 2 | −3.7 | −25.9 | 210 | 3.9 | 0.62 |
| 54 | 1000 | 75.5 | 652 | −4.9 | −23.8 | 1337 | 3.2 | 0.71 |
| 55 | 1000 | 72.0 | 11 | −1.9 | −20.1 | 940 | 3.6 | 0.71 |
| 56 | 100 | 33.0 | 132 | −2.1 | −20.6 | 1720 | 9.0 | 0.64 |
| 57 | 1000 | 72.1 | 1247 | −4.5 | −27.5 | 1100 | 6.0 | 0.63 |
| 58 | 100 | 46.0 | 217 | −3.3 | −24.2 | 1580 | 8.3 | 0.61 |
| 59 | 1000 | 77.5 | 402 | −5.4 | −24.5 | 1120 | 7 | 0.60 |
| 60 | 1000 | 56.2 | 5 | −3.8 | −25.9 | 320 | 4.2 | 0.62 |

TABLE 1-continued

Polymerization of 1,3 butadiene with catalytic systems prepared in situ

| Example | Al/Ln (molar ratio) | Conver. (%) | N$^{(a)}$ (h$^{-1}$) | T$_m$$^{(b)}$ (° C.) | T$_c$$^{(c)}$ (° C.) | M$_w$ × 10$^{-3}$ (g × mol$^{-1}$) | M$_w$/M$_n$ | α$^{(d)}$ |
|---|---|---|---|---|---|---|---|---|
| 61 | 1000 | 33.0 | 114 | −5.1 | −21.3 | 1400 | 6.9 | 0.62 |
| 62 | 1000 | 18.1 | 94 | −2.0 | −20.5 | 980 | 5.2 | 0.61 |
| 63 | 1000 | 28.4 | 41 | −2.2 | −20.7 | 1600 | 9.4 | 0.61 |
| 64 | 1000 | 26.3 | 227 | −1.9 | −20.3 | 1300 | 6.3 | 0.62 |
| 65 | 100 | 22.3 | 58 | −1.7 | −21.9 | 1070 | 7.0 | 0.62 |
| 66 | 1000 | 17.4 | 23 | −2.5 | −22.6 | 1190 | 7.1 | 0.63 |
| 67 | 1000 | 52.7 | 455 | −1.8 | −21.7 | 690 | 6.3 | 0.61 |
| 68 | 100 | 46.9 | 303 | −2.0 | −22.1 | 570 | 4.7 | 0.59 |

$^{(a)}$number of moles of 1,3-butadiene polymerized, per hour, per mole of lanthanide;
$^{(b)}$melting point;
$^{(c)}$crystallization temperature;
$^{(d)}$linearity index of polybutadiene.

Example 69

P1830

2 ml of isoprene, equal to about 1.36 g, were introduced, at a temperature of 20° C., into a 25 ml test-tube. 7.25 ml of heptane were then added and the temperature of the solution was maintained at 20° C. Tetra-iso-butyl-aluminoxane (TIBAO) in a cyclohexane solution (6.22 ml; 1×10$^{-2}$ moles, equal to about 2.9 g) was then added, and subsequently the complex NdCl$_3$(L2) [sample GL457] (2.55 ml of a toluene solution at a concentration equal to 2 mg/ml; 1×10$^{-5}$ moles, equal to about 5.1 mg) obtained as described in Example 18. The whole mixture was kept, under magnetic stirring, at 20° C., for 19 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.181 g of polyisoprene having a content of 1,4-cis units equal to 98% and a glass transition temperature (TO equal to −64.9° C.: further characteristics of the process and of the polyisoprene obtained are indicated in Table 2.

FIG. 4 shows the $^1$H-NMR and $^{13}$C-NMR spectra of the polyisoprene obtained.

Figure 7:
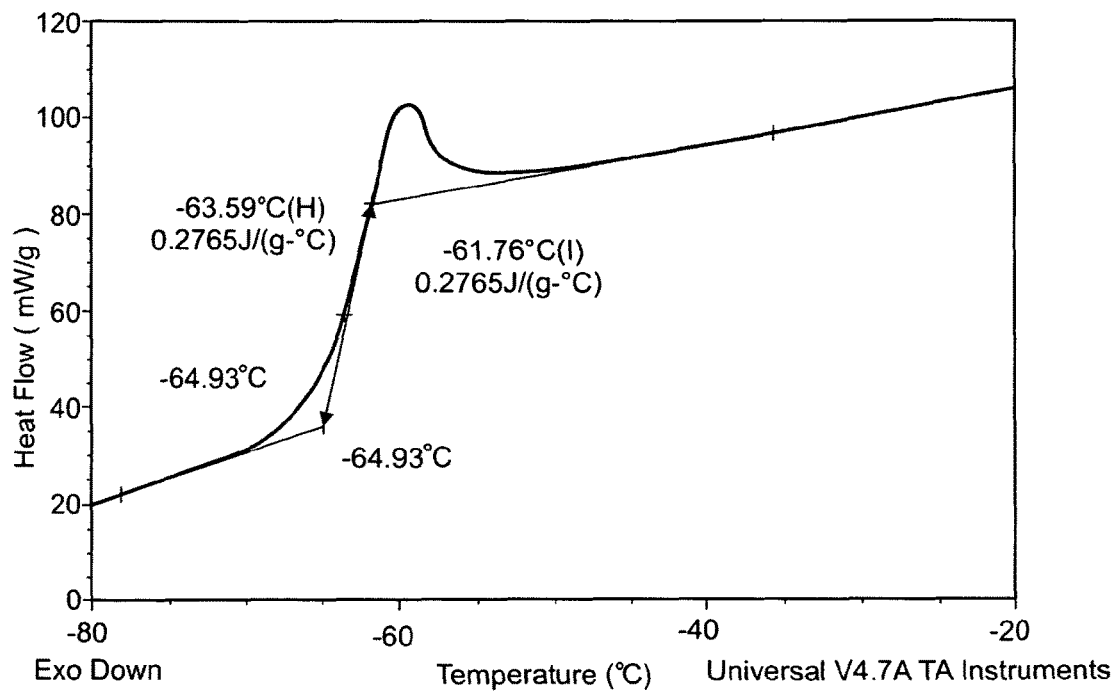
FIG. 7 illustrates DSC diagram of polyisoprene obtained by means of NdCl$_3$(L2)/TIBAO (Table 2, Example 69).

FIG. 7 shows the DSC diagram of the polyisoprene obtained.

Example 70

GL562

2 ml of isoprene, equal to about 1.36 g, were introduced, at a temperature of 20° C., into a 25 ml test-tube. 7.25 ml of heptane were then added and the temperature of the solution was maintained at 20° C. Tetra-iso-butyl-aluminoxane (TIBAO) in a cyclohexane solution (6.2 ml; 1×10$^{-2}$ moles, equal to about 2.9 g) was then added, and subsequently the complex NdCl$_3$(L3) [sample GL455] (2.55 ml of a toluene solution at a concentration equal to 2 mg/ml; 1×10$^{-5}$ moles, equal to about 5.1 mg) obtained as described in Example 19. The whole mixture was kept, under magnetic stirring, at 20° C., for 22 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.231 g of polyisoprene having a content of 1,4-cis units >98%: further characteristics of the process and of the polyisoprene obtained are indicated in Table 2.

Example 71

P1887

2 ml of isoprene, equal to about 1.36 g, were introduced, at a temperature of 20° C., into a 25 ml test-tube. 7.3 ml of heptane were then added and the temperature of the solution was maintained at 20° C. Tetra-iso-butyl-aluminoxane (TIBAO) in a cyclohexane solution (6.2 ml; 1×10$^{-2}$ moles, equal to about 2.9 g) was then added, and subsequently the complex NdCl$_3$(L14) [sample GL456] (2.5 ml of a toluene solution at a concentration equal to 2 mg/ml; 1×10$^{-5}$ moles, equal to about 5 mg) obtained as described in Example 30. The whole mixture was kept, under magnetic stirring, at 20° C., for 35 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.690 g of polyisoprene having a content of 1,4-cis units >98% and a glass transition temperature (TO equal to −65.0° C.: further characteristics of the process and of the polyisoprene obtained are indicated in Table 2.

Figure 9:
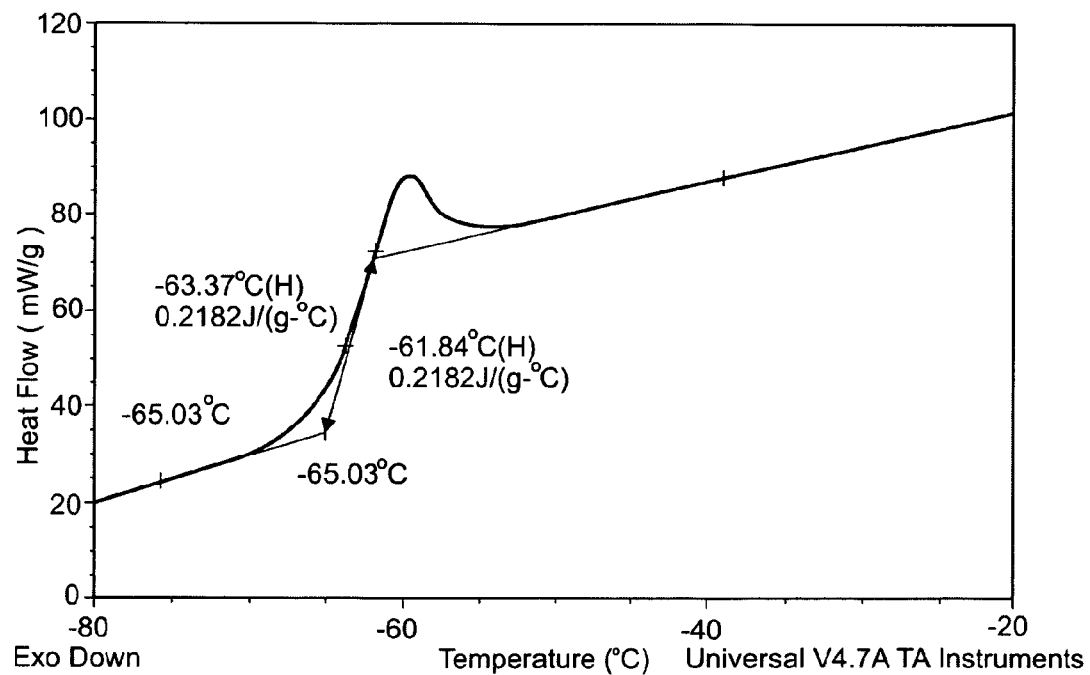
FIG. 9 illustrates DSC Diagram of polyisoprene obtained with NdC$_3$(L14)/TIBAO (Table 2, Example 71).

FIG. 9 shows the DSC diagram of the polyisoprene obtained.

Example 72

P1831

2 ml of isoprene, equal to about 1.36 g, were introduced, at a temperature of 20° C., into a 25 ml test-tube. 7.3 ml of heptane were then added and the temperature of the solution was maintained at 20° C. Tetra-iso-butyl-aluminoxane (TIBAO) in a cyclohexane solution (6.2 ml; 1×10$^{-2}$ moles, equal to about 2.9 g) was then added, and subsequently the complex NdCl$_3$(L14) [sample P1822] (2.55 ml of a toluene solution at a concentration equal to 2 mg/ml; 1×10$^{-5}$ moles, equal to about 5.1 mg) obtained as described in Example 20. The whole mixture was kept, under magnetic stirring, at 20° C., for 19 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.36 g of polyisoprene having a content of 1,4-cis units >98% and a glass transition temperature (TO equal to −64.7° C.: further characteristics of the process and of the polyisoprene obtained are indicated in Table 2.

Figure 8:
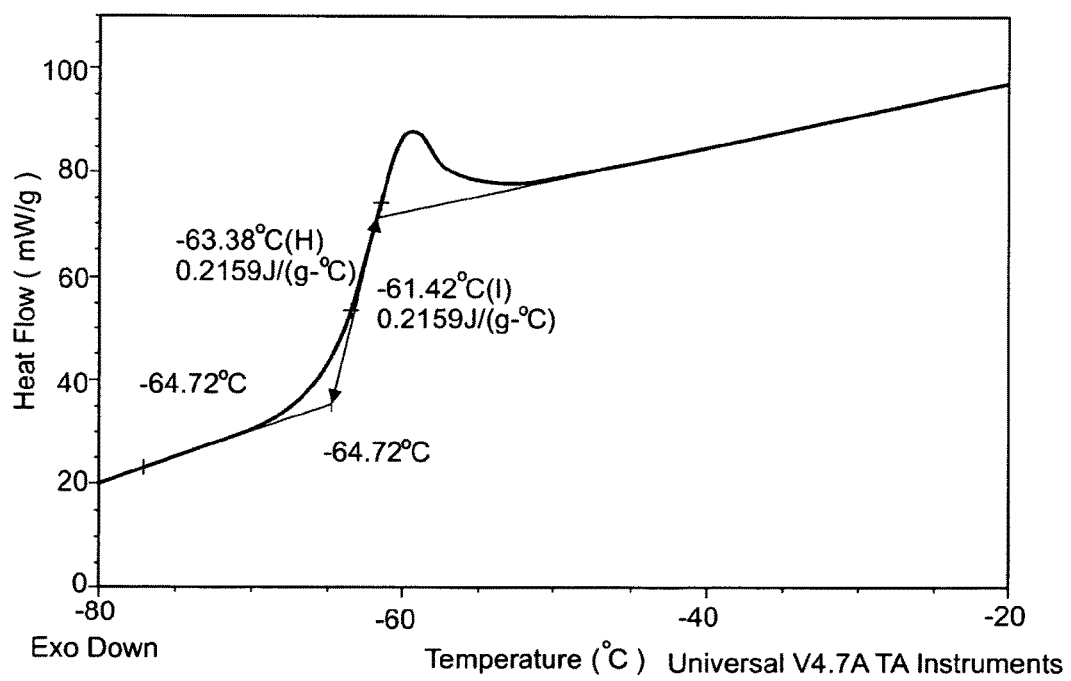
FIG. 8 illustrates DSC diagram of polyisoprene obtained by means of NdCl$_3$(L4)/TIBAO (Table 2, Example 72).

FIG. 8 shows the DSC diagram of the polyisoprene obtained.

Example 73

GL522

2 ml of isoprene, equal to about 1.36 g, were introduced, at a temperature of 20° C., into a 25 ml test-tube. 7.15 ml of toluene were then added and the temperature of the solution was maintained at 20° C. Methylaluminoxane (MAO) was then added (6.3 ml; $1 \times 10^{-2}$ moles, equal to about 0.58 g), and subsequently the complex $NdCl_3(L14)$ [sample P1822] (2.55 ml of a toluene solution at a concentration equal to 2 mg/ml; $1 \times 10^{-5}$ moles, equal to about 5.1 mg) obtained as described in Example 20. The whole mixture was kept, under magnetic stirring, at 20° C., for 240 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.151 g of polyisoprene having a content of 1,4-cis units >98%: further characteristics of the process and of the polyisoprene obtained are indicated in Table 2.

Example 74

GL523

2 ml of isoprene, equal to about 1.36 g, were introduced, at a temperature of 20° C., into a 25 ml test-tube. 6.85 ml of toluene were then added and the temperature of the solution was maintained at 20° C. Methylaluminoxane (MAO) was then added (6.3 ml; $1 \times 10^{-2}$ moles, equal to about 0.58 g), and subsequently the complex $NdCl_3(L9)$ [sample P1821] (2.85 ml of a toluene solution at a concentration equal to 2 mg/ml; $1 \times 10^{-5}$ moles, equal to about 5.7 mg) obtained as described in Example 25. The whole mixture was kept, under magnetic stirring, at 20° C., for 240 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.11 g of polyisoprene having a content of 1,4-cis units >98%: further characteristics of the process and of the polyisoprene obtained are indicated in Table 2.

Example 75

GL516

2 ml of isoprene, equal to about 1.36 g, were introduced, at a temperature of 20° C., into a 25 ml test-tube. 6.95 ml of heptane were then added and the temperature of the solution was maintained at 20° C. Tetra-iso-butyl-aluminoxane (TIBAO) in a cyclohexane solution (6.2 ml; $1 \times 10^{-2}$ moles, equal to about 2.9 g) was then added, and subsequently the complex $NdCl_3(L9)$ [sample P1821] (2.85 ml of a toluene solution at a concentration equal to 2 mg/ml; $1 \times 10^{-5}$ moles, equal to about 5.7 mg) obtained as described in Example 25. The whole mixture was kept, under magnetic stirring, at 20° C., for 30.5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.821 g of polyisoprene having a content of 1,4-cis units >98%: further characteristics of the process and of the polyisoprene obtained are indicated in Table 2.

Example 76

GL553

2 ml of isoprene, equal to about 1.36 g, were introduced, at a temperature of 20° C., into a 25 ml test-tube. 7.4 ml of toluene were then added and the temperature of the solution was maintained at 20° C. Methylaluminoxane (MAO) was then added (6.3 ml; $1 \times 10^{-2}$ moles, equal to about 0.58 g), and subsequently the complex $NdCl_3(L10)$ [sample P1863] (2.3 ml of a toluene solution at a concentration equal to 2 mg/ml; $1 \times 10^{-5}$ moles, equal to about 4.6 mg) obtained as described in Example 26. The whole mixture was kept, under magnetic stirring, at 20° C., for 264 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.252 g of polyisoprene having a content of 1,4-cis units >98%: further characteristics of the process and of the polyisoprene obtained are indicated in Table 2.

Example 77

GL557

2 ml of isoprene, equal to about 1.36 g, were introduced, at a temperature of 20° C., into a 25 ml test-tube. 7.5 ml of heptane were then added and the temperature of the solution was maintained at 20° C. Tetra-iso-butyl-aluminoxane (TIBAO) in a cyclohexane solution (6.2 ml; $1 \times 10^{-2}$ moles, equal to about 2.9 g) was then added, and subsequently the complex $NdCl_3(L10)$ [sample P1863] (2.3 ml of a toluene solution at a concentration equal to 2 mg/ml; $1 \times 10^{-5}$ moles, equal to about 4.6 mg) obtained as described in Example 26. The whole mixture was kept, under magnetic stirring, at 20° C., for 16 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.36 g of polyisoprene having a content of 1,4-cis units >98%: further characteristics of the process and of the polyisoprene obtained are indicated in Table 2.

Example 78

Preparation of the Preformed Ternary Catalytic System $AlEt_2Cl/Nd(OCOC_7H_{15})_3/Al(^tBu)_3$ 15 ml of a heptane solution 0.05 M of neodymium 2-ethylhexanoate $[Nd(OCOC_7H_{15})_3]$ ($7.5 \times 10^{-4}$ moles), 16.6 ml of heptane and 0.29 ml of di-ethyl aluminium chloride $(AlEt_2Cl)$ ($2.3 \times 10^{-3}$ moles) were introduced consecutively into a 50 ml test-tube. Upon the addition of di-ethyl aluminium chloride $(AlEt_2Cl)$, a whitish suspension was immediately formed, which was kept, under stirring, at room temperature, for 15 minutes. Tri-iso-butylaluminium [TIBA] (5.63 ml; 2.25×10$^{-2}$ moles) was subsequently added and the solution obtained was left to age for 2 hours, under constant stirring, at 20° C., obtaining a catalytic suspension having a concentration of neodymium equal to 0.02 M.

Example 79

Comparative 2 ml of isoprene, equal to about 1.36 g, were introduced, at a temperature of 20° C., into a 25 ml test-tube. 15.5 ml of heptane were then added and the temperature of the solution was maintained at 20° C. The preformed ternary catalyst AlEt$_2$Cl/Nd(OCOC$_7$H$_{15}$)$_3$/Al($^i$Bu)$_3$ (0.5 ml; 1×10$^{-5}$ moles of Nd), obtained as described in Example 71, was then added. The whole mixture was kept, under magnetic stirring, at 20° C., for 6 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.544 g of polyisoprene having a content of 1,4-cis units equal to about 94%: further characteristics of the process and of the polyisoprene obtained are indicated in Table 2.

FIG. 1 shows the $^1$H-NMR spectrum of the polyisoprene obtained.

TABLE 2

Polymerization of isoprene with catalytic systems prepared in situ

| EX. | Al/Ln (molar rario) | Convers. (%) | N$^{(a)}$ (h$^{-1}$) | Mw × 10$^{-3}$ (g × mol$^{-1}$) | Mw/Mn | T$_g^{(b)}$ (° C.) |
|---|---|---|---|---|---|---|
| 69 | 1000 | 86.8 | 91 | 850 | 4.8 | −64.9 |
| 70 | 1000 | 90.5 | 82 | 900 | 5.5 | −65.6 |
| 71 | 1000 | 50.7 | 29 | 760 | 6 | −65.0 |
| 72 | 1000 | 100 | 105 | 800 | 8 | −64.7 |
| 73 | 1000 | 11.1 | 1 | 150 | 3.9 | — |
| 74 | 1000 | 8.1 | 1 | 162 | 4.5 | — |
| 75 | 1000 | 60.4 | 40 | 790 | 6.5 | −65.5 |
| 76 | 1000 | 18.5 | 1 | 200 | 3.7 | — |
| 77 | 1000 | 100 | 125 | 1000 | 8.4 | −66.1 |
| 79 | 1000 | 6 | 40 | 133 | 4 | −65.8 |
| NR$^{(c)}$ | — | — | — | — | — | −66.2 |

$^{(a)}$number of isoprene moles polymerized per hour per lanthanide mole;
$^{(b)}$glass transition temperature;
$^{(c)}$natural rubber.

Example 80

Preparation of the Preformed Catalyst NdCl$_3$(L11)/TIBAO 58.8 mg (1.2×10$^{-4}$ moles) of the complex NdCl$_3$(L11) [sample P1892] obtained as described in Example 30, were dissolved in toluene (3.8 ml), in a 50 ml test-tube, and tetra-iso-butyl-aluminoxane (TIBAO) in a cyclohexane solution (2.04 ml; 3.6 moles) was subsequently added, obtaining a dark brown solution which was left to age, under stirring, at room temperature, for 2 hours. The catalytic solution obtained has a concentration of neodymium equal to 0.02 M.

Example 81

Preparation of the Preformed Catalyst NdCl$_3$(L11)/DIBAH 65.1 mg (1.34×10$^{-4}$ moles) of the complex NdCl$_3$(L11) [sample P1892] obtained as described in Example 30, were dissolved in toluene (6 ml), in a 50 ml test-tube, and di-iso-butyl-aluminium hydride (DIBAH) (0.72 ml; 4×10$^{-2}$ moles) was subsequently added, obtaining a brown-red solution which was left to age, under stirring, at room temperature, for 2 hours. The catalytic solution obtained has a concentration of neodymium equal to 0.02 M.

Example 82

Preparation of the Preformed Catalyst NdCl$_3$(L11)/DIBAH

The same procedure was carried out as described in Example 81, except that the brown-red solution obtained was left to age, under stirring, at room temperature, for 5 days.

Example 83

Preparation of the Preformed Catalyst NdCl$_3$(L11)/DIBAH

The same procedure was carried out as described in Example 81, except that the brown-red solution obtained was left to age, under stirring, at room temperature, for 6 days.

Example 84

Preparation of the Preformed Catalyst NdCl$_3$(L3)/TIBAO 63.5 mg of the complex NdCl$_3$(L3) [sample GL455] obtained as described in Example 22, were dissolved in toluene (3.9 ml), in a 50 ml test-tube, and tetra-iso-butyl-aluminoxane (TIBAO) (2.3 ml; 3.69 mmoles) was subsequently added, obtaining a yellow-orange solution which was left to age, under stirring, at room temperature, for 5 days. The catalytic solution obtained has a concentration of neodymium equal to 0.02 M.

Example 85

Preparation of the Preformed Catalyst NdCl$_3$(L3)/DIBAH 85.4 mg of the complex NdCl$_3$(L3) [sample GL455] obtained as described in Example 22, were dissolved in toluene (7.4 ml), in a 50 ml test-tube, and di-iso-butyl-aluminium hydride (DIBAH) (0.83 ml; 4.7×10$^{-2}$ moles) was subsequently added, obtaining a yellow-olive-coloured solution which was left to age, under stirring, at room temperature, for 2 hours. The catalytic solution obtained has a concentration of neodymium equal to 0.02 M.

Example 86

Preparation of the Preformed Catalyst
NdCl$_3$(L3)/DIBAH

The same procedure was carried out as described in Example 85, except that the yellow-olive-coloured solution obtained was left to age, under stirring, at room temperature, for 5 days.

Example 87

Preparation of the Preformed Catalyst
NdCl$_3$(L3)/DIBAH

The same procedure was carried out as described in Example 85, except that the yellow-olive-coloured solution obtained was left to age, under stirring, at room temperature, for 6 days.

Example 88

Preparation of the Preformed Ternary Catalytic
System AlEt$_2$Cl/Nd(OCOC$_2$H$_{15}$)$_3$/Al($^i$Bu)$_3$ The same procedure was carried out as described in Example 78, except that the solution was left to age, under stirring, at room temperature, for 1 day.

Example 89

P1952

2 ml of 1,3-butadiene, equal to about 1.4 g, were condensed, at a low temperature (−20° C.), in a 25 ml test-tube. 16 ml of heptane were then added and the temperature of the solution thus obtained was brought to 20° C. The catalytic solution obtained as described in Example 80 (1 ml; 2×10$^{-5}$ moles of Nd) was then added. The whole mixture was kept, under magnetic stirring, at 20° C., for 115 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.078 g of polybutadiene having a content of 1,4-cis units >99%: further characteristics of the process and of the polybutadiene obtained are indicated in Table 3.

Example 90

P1953

2 ml of 1,3-butadiene, equal to about 1.4 g, were condensed, at a low temperature (−20° C.), in a 25 ml test-tube. 16 ml of heptane were then added and the temperature of the solution thus obtained was brought to 20° C. The catalytic solution obtained as described in Example 81 (1 ml; 2×10$^{-5}$ moles of Nd) was then added. The whole mixture was kept, under magnetic stirring, at 20° C., for 45 minutes. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.364 g of polybutadiene having a content of 1,4-cis units >99%: further characteristics of the process and of the polybutadiene obtained are indicated in Table 3.

Example 91

P1956

2 ml of 1,3-butadiene, equal to about 1.4 g, were condensed, at a low temperature (−20° C.), in a 25 ml test-tube. 16 ml of heptane were then added and the temperature of the solution thus obtained was brought to 20° C. The catalytic solution obtained as described in Example 82 (1 ml; 2×10$^{-5}$ moles of Nd) was then added. The whole mixture was kept, under magnetic stirring, at 20° C., for 4.2 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.994 g of polybutadiene having a content of 1,4-cis units >99%: further characteristics of the process and of the polybutadiene obtained are indicated in Table 3.

Example 92

P1959

2 ml of 1,3-butadiene, equal to about 1.4 g, were condensed, at a low temperature (−20° C.), in a 25 ml test-tube. 16 ml of heptane were then added and the temperature of the solution thus obtained was brought to 20° C. The catalytic solution obtained as described in Example 83 (1 ml; 2×10$^{-5}$ moles of Nd) was then added. The whole mixture was kept, under magnetic stirring, at 70° C., for 2 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.40 g of polybutadiene having a content of 1,4-cis units >99%: further characteristics of the process and of the polybutadiene obtained are indicated in Table 3.

Example 93

P1958

2 ml of 1,3-butadiene, equal to about 1.4 g, were condensed, at a low temperature (−20° C.), in a 25 ml test-tube. 16 ml of heptane were then added and the temperature of the solution thus obtained was brought to 20° C. The catalytic solution obtained as described in Example 84 (1 ml; 2×10$^{-5}$ moles of Nd) was then added. The whole mixture was kept, under magnetic stirring, at 20° C., for 28 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.220 g of polybutadiene having a content of 1,4-cis units >99%: further characteristics of the process and of the polybutadiene obtained are indicated in Table 3.

Example 94

P1955

2 ml of 1,3-butadiene, equal to about 1.4 g, were condensed, at a low temperature (−20° C.), in a 25 ml test-tube.

16 ml of heptane were then added and the temperature of the solution thus obtained was brought to 20° C. The catalytic solution obtained as described in Example 85 (1 ml; 2×10$^{-5}$ moles of Nd) was then added. The whole mixture was kept, under magnetic stirring, at 20° C., for 5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.490 g of polybutadiene having a content of 1,4-cis units >99%: further characteristics of the process and of the polybutadiene obtained are indicated in Table 3.

Example 95

P1957

2 ml of 1,3-butadiene, equal to about 1.4 g, were condensed, at a low temperature (−20° C.), in a 25 ml test-tube. 16 ml of heptane were then added and the temperature of the solution thus obtained was brought to 20° C. The catalytic solution obtained as described in Example 86 (1 ml; 2×10$^{-5}$ moles of Nd) was then added. The whole mixture was kept, under magnetic stirring, at 20° C., for 5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.542 g of polybutadiene having a content of 1,4-cis units >99%: further characteristics of the process and of the polybutadiene obtained are indicated in Table 3.

Example 96

P1960

2 ml of 1,3-butadiene, equal to about 1.4 g, were condensed, at a low temperature (−20° C.), in a 25 ml test-tube. 16 ml of heptane were then added and the temperature of the solution thus obtained was brought to 20° C. The catalytic solution obtained as described in Example 87 (1 ml; 2×10$^{-5}$ moles of Nd) was then added. The whole mixture was kept, under magnetic stirring, at 70° C., for 2 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.242 g of polybutadiene having a content of 1,4-cis units >99%: further characteristics of the process and of the polybutadiene obtained are indicated in Table 3.

Example 97

Comparative (BR40)

2 ml of 1,3-butadiene, equal to about 1.4 g, were condensed, at a low temperature (−20° C.), in a 25 ml test-tube. 16 ml of heptane were then added and the temperature of the solution thus obtained was brought to 20° C. The catalytic solution obtained as described in Example 88 (1 ml; 2×10$^{-5}$ moles of Nd) was then added. The whole mixture was kept, under magnetic stirring, at 20° C., for 1.25 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.700 g of polybutadiene having a content of 1,4-cis units equal to about 96%: further characteristics of the process and of the polybutadiene obtained are indicated in Table 3.

FIG. 1 shows the $^1$H-NMR spectrum of the polybutadiene obtained.

FIG. 2(a) shows the FT-IR spectrum of the polybutadiene obtained.

TABLE 3

Polymerization of 1,3-butadiene with preformed catalytic systems

| Example | Convers. (%) | N[a] (h$^{-1}$) | $T_m$[b] (° C.) | $T_c$[c] (° C.) | $M_w$ × 10$^{-3}$ (g × mol$^{-1}$) | $M_w/M_n$ | α[d] |
|---|---|---|---|---|---|---|---|
| 89 | 77 | 11 | −1.8 | −22.1 | 980 | 7.5 | 0.63 |
| 90 | 26 | 450 | −1.7 | −21.6 | 1320 | 5.9 | 0.63 |
| 91 | 71 | 221 | −1.7 | −21.8 | 1100 | 5.8 | 0.65 |
| 92 | 100 | | −2.0 | −21.5 | 1150 | 5.6 | 0.64 |
| 93 | 15.7 | 7 | −1.5 | −21 | 870 | 6.9 | 0.63 |
| 94 | 35 | 91 | −2.2 | −22.7 | 950 | 6.3 | 0.62 |
| 95 | 38.7 | 100 | −2 | −22.5 | 1070 | 6.5 | 0.61 |
| 96 | 88.7 | 444 | −1.9 | −21.9 | 990 | 6.2 | 0.63 |
| 97 | 50 | 515 | −6 | −33 | 550 | 5 | 0.60 |

[a] number of moles of 1,3-butadiene polymerized per hour per lanthanide mole;
[b] melting point;
[c] crystallization temperature;
[d] polybutadiene linearity index.

The invention claimed is:
1. A bis-imine complex of lanthanides having general formula (I):

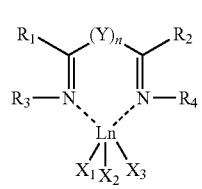

wherein:
Ln represents a metal of the series of lanthanides;
n is 0 or 1;
Y represents a —CHR group wherein R represents a hydrogen atom, or a linear or branched $C_1$-$C_{20}$ alkyl group;
$R_1$ and $R_2$, equal to or different from each other, represent a hydrogen atom; or they are selected from linear or branched $C_1$-$C_{20}$ alkyl groups, cycloalkyl groups optionally substituted; or $R_1$ and $R_2$ are optionally bound to each other so as to form, together with the other atoms to which they are bound, a saturated, unsaturated or aromatic cycle containing from 4 to 6 carbon atoms, optionally substituted with linear or branched $C_1$-$C_{20}$ alkyl groups, said cycle optionally containing heteroatoms;
$R_3$ and $R_4$, equal to or different from each other, represent a hydrogen atom; or they are selected from linear or branched $C_1$-$C_{20}$ alkyl groups, cycloalkyl groups optionally substituted, aryl groups optionally substituted;
or $R_2$ and $R_4$ are optionally bound to each other so as to form, together with the other atoms to which they are bound, a saturated, unsaturated or aromatic cycle containing from 3 to 6 carbon atoms, optionally substituted with linear or branched $C_1$-$C_{20}$ alkyl groups, said cycle optionally containing other heteroatoms;

or $R_1$ and $R_3$ can be optionally bound to each other so as to form, together with the other atoms to which they are bound, a saturated, unsaturated or aromatic cycle containing from 3 to 6 carbon atoms, optionally substituted with linear or branched $C_1$-$C_{20}$ alkyl groups, said cycle optionally containing other heteroatoms; and $X_1$, $X_2$ and $X_3$, equal to or different from each other, represent a halogen atom; or they are selected from linear or branched $C_1$-$C_{20}$ alkyl groups, —$OCOR_5$ or —$OR_5$ groups wherein $R_5$ is selected from linear or branched $C_1$-$C_{20}$ alkyl groups.

2. The bis-imine complex of lanthanides having general formula (I) according to claim 1, wherein Ln represents neodymium (Nd), lanthanum (La), praseodymium (Pr), gadolinium (Gd), europium (Eu), terbium (Tb), samarium (Sm), erbium (Er), or ytterbium (Yb).

3. The bis-imine complex of lanthanides having general formula (I) according to claim 1, wherein:

Ln is neodymium (Nd), lanthanum (La), praseodymium (Pr), or gadolinium (Gd);

$R_1$ and $R_2$, the same as each other, are a hydrogen atom; or they are selected from linear or branched $C_1$-$C_{20}$ alkyl groups; or they are selected from cycloalkyl groups optionally substituted;

$R_3$ and $R_4$, equal to or different from each other, are selected from linear or branched $C_1$-$C_{20}$ alkyl groups; or they are selected from phenyl groups optionally substituted; or they are selected from cycloalkyl groups optionally substituted;

$X_1$, $X_2$ and $X_3$, the same as each other, represent a halogen atom.

4. The bis-imine complex of lanthanides having general formula (I) according to claim 1, wherein:

Ln is neodymium (Nd), lanthanum (La), praseodymium (Pr), or gadolinium (Gd);

$R_1$ and $R_3$ are bound to each other and together with the other atoms to which they are bound, form a pyridine;

$R_2$ is a hydrogen atom; or it is selected from linear or branched $C_1$-$C_{20}$ alkyl groups;

$R_4$ is selected from phenyl groups optionally substituted; or it is selected from cycloalkyl groups optionally substituted; and $X_1$, $X_2$ and $X_3$, the same as each other, represent a halogen atom.

5. A catalytic system for the (co)polymerization of conjugated dienes comprising:

(a) at least one bis-imine complex of lanthanides having general formula (I) according to claim 1;

(b) at least one co-catalyst selected from:

(b$_1$) aluminium alkyls having general formula (II):

$$Al(X')_n(R_6)_{3-n} \qquad (II)$$

wherein X' represents a halogen atom; $R_6$ is selected from linear or branched $C_1$-$C_{20}$ alkyl groups, $C_3$-$C_{20}$ cycloalkyl groups, aryl groups, said groups being optionally substituted with one or more atoms of silicon or germanium; and n is an integer ranging from 0 to 2;

(b$_2$) aluminoxanes having general formula (III):

$$(R_7)_2\text{—Al—O—}[\text{—Al}(R_8)\text{—O—}]_p\text{—Al—}(R_9)_2 \qquad (III)$$

wherein $R_7$, $R_8$ and $R_9$, equal to or different from each other, represent a hydrogen atom, a halogen atom; or they are selected from linear or branched $C_1$-$C_{20}$ alkyl groups, $C_3$-$C_{20}$ cycloalkyl groups, aryl groups, said groups being optionally substituted with one or more atoms of silicon or germanium; and p is an integer ranging from 0 to 1,000; and (b$_3$) compounds having general formula (IV):

$$D^+E^- \qquad (IV)$$

wherein $D^+$ represents a Brønsted acid capable of releasing a proton and of reacting irreversibly with the substituent X of the bis-imine complex of lanthanides having general formula (I); $E^-$ represents a compatible anion capable of stabilizing the active catalytic species generated by the reaction of the two components and which is sufficiently labile as to be removed by an olefin monomer, or an anion having general formula $B(Ar)_4^{(-)}$ wherein the substituents Ar, equal to or different from each other, are selected from aryl groups.

6. The catalytic system for the (co)polymerization of conjugated dienes according to claim 5, wherein said co-catalyst (b) is selected from tri-iso-butyl-aluminum (TIBA), di-iso-butyl-aluminum hydride (DIBAH), methylaluminoxane (MAO), or tetra-iso-butyl-aluminumoxane (TIBAO).

7. The catalytic system for the (co)polymerization of conjugated dienes according to claim 5, wherein in said catalytic system the molar ratio between the lanthanide present in the bis-imine complex of lanthanides (a) having general formula (I) and the aluminium present in the co-catalyst (b) selected from aluminium alkyls (b$_1$) or aluminumoxanes (b$_2$), ranges from 5 to 5,000.

8. The catalytic system for the (co)polymerization of conjugated dienes according to claim 5, wherein in said catalytic system the molar ratio between the lanthanide present in the bis-imine complex of lanthanides (a) having general formula (I) and the boron present in the co-catalyst (b) selected from the compounds (b$_3$) having general formula (IV), ranges from 0.1 to 15.

9. The catalytic system according to claim 5, wherein said conjugated dienes are 1,3-butadiene, isoprene.

* * * * *